United States Patent [19]

Itoh et al.

[11] Patent Number: 5,485,295
[45] Date of Patent: Jan. 16, 1996

[54] LIQUID CRYSTAL DISPLAY APPARATUS HAVING DRIVING VOLTAGE TO ENABLE LIGHT OF MANY WAVELENGTHS TO TAKE A SAME SIGN ALONG ONE AXIS OF A POINCARE SPHERE

[75] Inventors: Osamu Itoh, Hitachi; Katsumi Kondo, Katsuta; Naoki Kikuchi; Hitomi Madokoro, both of Mobara, all of Japan

[73] Assignees: Hitachi, Ltd., Tokyo; Hitachi Device Engineering & Co., Ltd., Chiba, both of Japan

[21] Appl. No.: 220,600

[22] Filed: Mar. 30, 1994

[30] Foreign Application Priority Data

Mar. 30, 1993 [JP] Japan ................... 5-072529

[51] Int. Cl.$^6$ ................................................. G02F 1/1335
[52] U.S. Cl. ........................................ 359/73; 359/63
[58] Field of Search ........................... 359/54, 55, 63, 359/73, 102; 345/94, 95

[56] References Cited

U.S. PATENT DOCUMENTS 4,007,979 2/1977 Coblitz ............................ 350/256
5,107,356 4/1992 Castleberry ........................ 359/63
5,166,817 11/1992 Ota ..................................... 359/73
5,291,322 3/1994 Itoh ..................................... 359/63

*Primary Examiner*—William L. Sikes
*Assistant Examiner*—Tiep H. Nguyen
*Attorney, Agent, or Firm*—Antonelli, Terry, Stout & Kraus

[57] ABSTRACT

The present invention provides a liquid crystal display apparatus having preferable viewing performance with low cost. A display in a dark state is performed with an applied voltage which makes a square sum of deviation of normalized Stokes parameters S1', S2' for light transmitted through a twisted nematic liquid crystal layer having wavelengths, 450 nm, 500 nm, 550 nm, 600 nm, 650 nm from their regression line 51 equal to or less than 0.05, a slow axis 52 of an optical compensation layer crosses over perpendicularly with the regression line 51 on a Poincare sphere sighted from a S3' axis direction, a phase difference of the optical compensation layer, $\delta(\lambda)$, is defined by the following equation;

$$\delta(\lambda)=180n\pm\arctan((S1'\cos2\theta-2S2'\sin2\theta)/S3')$$

and an absorbing axis 53 of a higher polarizer is set so as to cross over either of two points, A and B, at which the regression line crosses over the equator on the Poincare sphere.

20 Claims, 32 Drawing Sheets

LIQUID CRYSTAL DISPLAY APPARATUS HAVING DRIVING VOLTAGE TO ENABLE LIGHT OF MANY WAVELENGTHS TO TAKE A SAME SIGN ALONG ONE AXIS OF A POINCARE SPHERE

BACKGROUND OF THE INVENTION

1. Field of the Invention

The present invention relates to a liquid crystal display apparatus, especially, to a supertwisted nematic liquid crystal display apparatus (STN-LCD) capable of a large volume and superfine display by using a multiplex driving means.

2. Description of the Prior Art

The liquid crystal display apparatus of the above described type comprises a pair of facing base plates having electrodes, a liquid crystal layer including supertwisted nematic liquid crystal, a pair of polarizers, and a driving means capable of charging at least two different voltages. The facing base plates hold the liquid crystal layer between, and the polarizers have a structure being arranged outside the facing base plates.

A STN-LCD becomes possible to display a large volume and superfine display driven with a multiplex driving means by (i) increasing 90 degrees twisted angle of conventional twisted nematic liquid crystal display to 180 degrees, and (ii) using a birefringent mode having 45 degrees for an angle forming by transmitting axis of the polarizer and a direction of an orientating process of the base plate.

However, as a side reaction of the above (ii), problems such as coloring of display, and lowering of a contrast ratio were caused. The contrast ratio is expressed by a factor, (transmission ratio in a bright state/transmission ratio in a dark state), and as a result of the side reaction, transmission ratio in a dark state increases and consequently, the contrast ratio is lowered.

A phase plate type STN-LCD which comprises the STN-LCD added with a birefringent plastic film resolved almost all of the coloring problem of the display, but the contrast ratio was at most about 20:1.

Additionally, various countermeasures have been proposed in JP-A-2-37321 (1990), JP-A-2-67518 (1990), JP-A-3-13916 (1991), JP-A-3-13917 (1991), JP-A-4-190325 (1992), JP-A-4-215619 (1992), and K. KUMAGAI et al (JAPAN DISPLAY 1989 page 312-315).

The prior art disclosed in JP-A-2-37321 (1990) intended to enhance a contrast ratio of the phase plate type STN-LCD by coinciding a wave length dependency of birefringence of the phase plate with that of a liquid crystal composition. However, as a twisted nematic layer has a twisted structure, an optical characteristics of the twisted nematic layer differs entirely from that of a bulk liquid crystal composition which does not have any twisted structure. Accordingly, the optical characteristics required for the phase plate is not only identical to that of the bulk liquid crystal compound, and the above prior art can not realize a higher contrast ratio than that of the present state.

The prior art disclosed in JP-A-2-67518 (1990) used two kinds of resins, the one has a positive oriented birefringence and the other has a negative oriented birefringence, respectively. Because of having a steep threshold characteristics, an optical characteristics the phase plate type STN-LCD changes quickly depending on alteration of charged voltage. Furthermore, the optical characteristics of the phase plate type STN-LCD has a wave length dependency, and the wave length dependency also changes quickly depending on alteration of the charged voltage. Accordingly, a display characteristics of the phase plate type STN-LCD changes remarkably depending on an arrangement of the phase plate and the polarizer, a driving condition of the STN-LCD, the optical characteristics of the phase plate, etc. The prior art disclosed in JP-A-2-67518 (1990) does not make optimization of the above described various condition. It is impossible to realize enhancing of contrast ratio of the phase plate type STN-LCD only by changing materials of the phase plate and increasing numbers of the phase plates.

In the prior art disclosed in JP-A-3-13916 (1991), a laminated phase plate wherein two phase plates having different wavelength dependency of birefringence each other are laminated so that each of extended axises crosses perpendicularly is used for the phase plate type STN-LCD. However, in contrast with the birefringent media used in JP-A-3-13916 (1991) which has a retardation of about 600 nm at wavelength 550 nm, the wavelength dependency of birefringence which is defined by an equation (2) explained later is 0.32. It is impossible to obtain a more enhanced contrast ratio than that of the present art using the above described birefringent media.

In the prior art disclosed in JP-A-3-13917 (1991), a laminated phase plate wherein two phase plates having different wavelength dependency of birefringence each other are laminated so that each of extended axises are placed in parallel is used for the phase plate type STN-LCD. However, the same problem as the one described above regarding to the art disclosed in JP-A-3-13916 (1991) can be said.

In the prior art published in "JAPAN DISPLAY" (1989) pp. 312–315, K. KUMAGAWA discloses a contrast ratio improving method for a STN-LCD using two phase plates. Polarization state of transmitting light with each wavelength distributes in a manner drawing an arc on a Poincare sphere sighted from a $S_3$ axis direction. Therefore, the contrast ratio is enhanced by converting the distribution to a distribution on a line using a first phase plate, subsequently, focusing the distribution on a line on a point of an equator on the Poincare sphere using a second phase plate.

The above described method can be practical if a wavelength dependency of birefringence of the phase plates can be controlled arbitrarily. However, actually, the birefringence of the phase plate has a restricted wavelength dependency. Therefore, the birefringence of the phase plate can not be controlled arbitrarily. Accordingly, regarding to the first phase plate, it is impossible to convert the distribution of the polarizing state of the transmitting lights with respective wavelengths to a complete linear state. Regarding to the second phase plate, it is impossible to concentrate the distribution on a line on a point of the equator.

Furthermore, K. KUMAGAWA did not teach any of optical characteristics of a liquid crystal layer, particularly on its applied voltage dependence.

The prior art disclosed in each of JP-A-4-190325 (1992) and JP-A-4-215619 (1992) has the same content as that of K. KUMAGAWA, and accordingly, both the prior art have the same problem.

SUMMARY OF THE INVENTION

1. Objects of the Invention

Objects of the present invention is to provide a liquid crystal display apparatus having a preferable viewing performance by enhancing a contrast ratio of a STN-LCD.

2. Methods of Solving the Problems

In order to realize the above described objects of the present invention, a liquid crystal display apparatus is provided in accordance with one of embodiments of the present invention, which comprising a pair of facing base plates provided with electrodes, a liquid crystal layer, two polarizers, at least one optical compensation layer, and a driving means capable of applying at least two different voltages, and having a structure wherein the liquid crystal layer is held between the pair of facing base plates, the polarizers are arranged outside the facing base plates, and the optical compensation layer is arranged between the polarizer and the facing base plate, characterized in that the driving means applies a voltage to the liquid crystal layer in a dark state, wherein the applied voltage is determined so as to give a same sign to S3' for lights of all wavelengths when lights transmitted through the liquid crystal layer having a plurality of wavelengths are expressed by normalized Stokes parameters (S1', S2', S3'), respectively, the optical compensation layer has a wavelength dependency of retardation which substantially coincides with a wavelength dependency of retardation in a condition of the liquid crystal layer wherein the normalized Stokes' parameter S3' of lights transmitted through the liquid crystal layer having a plurality of wavelengths takes a same sign for lights of all wavelengths, and furthermore, the optical compensation layer is so arranged that its slow axis crosses with regression lines, which are obtained for S1' and S2' among the normalized Stokes parameters (S1', S2', S3') for lights transmitted through the liquid crystal layer having a plurality of wavelengths, at surface of a Poincare sphere sighted from a S3" axis direction, and the polarizers which particularly locate at a place of the optical compensation layer existing side are so set in an angle that an absorbing axis of the polarizer passes through any one of two points where the above regression line crosses over the equator at surface of the Poincare sphere sighted from a S3' axis direction.

The driving means can be composed with steps for obtaining regression lines for S1' and S2' among the normalized Stokes parameters (S1', S2', S3') for lights transmitted through the liquid crystal layer having a plurality of wavelengths, and performing a display in a dark state with an applied voltage which is so determined that a square sum of deviation between the regression line and each of transmitting lights, S1' and S2', having respective wavelength becomes less or equal to a predetermined value.

Taking an angle which is formed by the regression line and the S1' axis on the Poincare sphere sighted from a S3' axis direction as 2θ, phase differences δ(λ) at each of plural wavelengths in the optical compensation layer can be obtained by the equation (1) where n is an arbitrary integer.

$$\delta(\lambda)=180 \cdot n \pm \arctan((S1'\cos 2\theta - 2S2'\sin 2\theta)/S3') \quad (1).$$

BRIEF DESCRIPTION OF THE DRAWINGS

FIGS. 2 are Poincare spheres sighted from a S3 axis direction for indicating a wavelength dependency of polarizing light transmitted through the liquid crystal layer, FIGS. 3 are Poincare spheres sighted from a S3 axis direction for indicating a wavelength dependency of polarizing light transmitted through the liquid crystal layer, FIGS. 18 are drawings for explaining a wavelength dependency of the polarizing light transmitted through the liquid crystal layer applied with 2.34 volt and the birefringent media in the liquid crystal display apparatus in the embodiment 2, FIGS. 29 are drawings for explaining a wavelength dependency of polarizing light transmitted through the liquid crystal layer applied with 2.24 volt and the birefringent media in the liquid crystal display apparatus in the comparative example 1, FIGS. 30 are drawings for explaining a wavelength dependency of polarizing light transmitted through the liquid crystal layer applied with 2.38 volt and the birefringent media in the liquid crystal display apparatus in the comparative example 1.

FIGS. 37 are Poincare spheres sighted from a S3 axis direction for indicating a classification of compensation methods for the wavelength dependency of polarizing light by birefringent media, FIGS. 38 are Poincare spheres sighted from a S3 axis direction for indicating a classification of compensation methods for the wavelength dependency of polarizing light by birefringent media, FIGS. 39 are Poincare spheres sighted from a S3 axis direction for indicating a classification of compensation methods for the wavelength dependency of polarizing light by birefringent media.

DETAILED DESCRIPTION OF THE EMBODIMENTS

Figure 1:
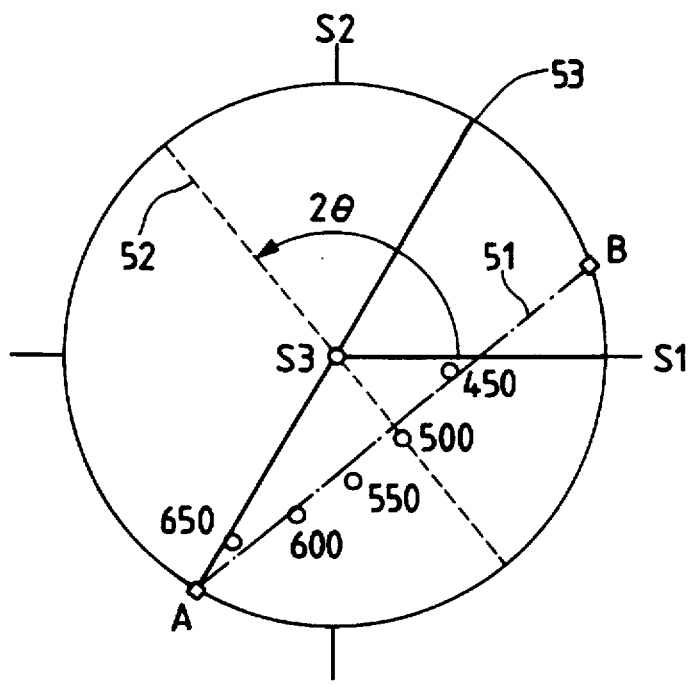
FIG. 1 is a Poincare sphere sighted from a S3 axis direction for explaining wavelength dependency of polarized state of a transmitting light in the present invention, and for indicating arranging angles of polarizers and phase plates.

As for more concretely, a liquid crystal display apparatus comprises in a manner hereinafter described.

On the liquid crystal display apparatus comprising a pair of facing base plates provided with electrodes, a liquid crystal layer, two polarizers, at least one optical compensation layer, and a driving means capable of applying at least two different voltages, and having a structure wherein the liquid crystal layer is held between the pair of facing base plates, the polarizers are arranged at top and bottom of the facing base plates, and the optical compensation layer is arranged between the polarizer and the facing base plate, the following four steps of works, for example (1)–(4), are performed.

(1) Obtaining regression lines for S1' and S2' among the normalized Stokes parameters (S1', S2', S3') for lights transmitted through the liquid crystal layer having wavelengths 450 nm, 500 nm, 550 nm, 600 nm, and 650 nm, respectively, and performing a display in a dark state with an applied voltage which is so determined that a square sum of deviation between the regression line and each of transmitting lights, S1' and S2', having respective wavelength becomes less or equal to 0.05.

(2) Setting the regression lines so as to cross over perpendicularly with a slow axis 52, which is defined as an optical axis having a larger refractive index than the other one between two optical axises in a plane of the optical compensation layer, at surface of the Poincare sphere sighted from a S3' axis direction.

(3) Obtaining phase differences δ(λ) at the optical compensation layer of respective wavelengths 450 nm, 500 nm, 550 nm, 600 nm, and 650 nm, by the equation (1) taking an angle which is formed by the slow axis of the optical compensation layer and the S1' axis on the Poincare sphere sighted from a S3' axis direction as 2θ.

(4) Setting an absorbing axis 53 of a top polarizer in an angle so that the absorbing axis 53 passes through either of point A or B defined as two crossing points of the regression line with the equator at surface of the Poincare sphere sighted from a S3' axis direction.

As for liquid crystal layer, a twisted nematic liquid crystal layer is used, and its twisted angle is selected from a range 180°–270°. The product $\Delta n_{LC} d_{LC}$ of thickness $d_{LC}$ and birefringence $\Delta n_{LC}$ of the twisted nematic liquid crystal layer can be controlled in a range 0.75 μm–1.0 μm. Further, a composition is available wherein a multiplex driving type XY matrix electrode is used as an electrode for the liquid crystal. The liquid crystal layer is so selected as to perform a display in a dark state with the highest voltage among voltages of at least two values supplied from the driving means, and to have a n equals to zero (n=0) and a positive sign for the second item in the equation (1) for the phase difference at wavelength 550 nm.

The optical compensation layer is so composed as to have a wavelength dependency of birefringence defined by the equation (2), where $\Delta n_R$ is a birefringence at wavelength 650 nm, $\Delta n_G$ is a birefringence at wavelength 550 nm, $\Delta n_B$ is a birefringence at wavelength 450 nm.

Wavelength dependency of birefringence=$(\Delta n_B - \Delta n_R)/\Delta n_G$  (2)

Furthermore, the optical compensation layer is composed of at least two birefringent media (phase plate A, phase plate B) having different wavelength dependency of birefringence each other by crossing over respective slow axis of the phase plate A and the phase plate B. For example, the optical compensation layer is so set that its wavelength dependency of birefringence is in a range 0.5–3.0, and a retardation at wavelength 550 nm is in a range 50 nm–200 nm.

The facing base plates are further provided with black matrixes for covering uncovered portions by electrodes.

The phase plate A is set so as to have the wavelength dependency of birefringence defined by the equation (2) of a range 0.0001–0.1, and the phase plate B is set so as to have the wavelength dependency of birefringence of a range 0.1–0.3. Retardation of the phase plate A is set smaller than that of the phase plate B. An angle formed by a transmitting axis of the polarizer at light source side with an optical axis of the phase plate B is set at most 30°.

The liquid crystal layer is a twisted nematic liquid crystal layer, and its twisted angle is in a range 180°–270°, the product $\Delta n_{LC} d_{LC}$ of thickness $d_{LC}$ and birefringence $\Delta n_{LC}$ of the twisted nematic liquid crystal layer is in a range 0.75 μm–1.0 μm, the electrode for supplying voltage to the liquid crystal is a multiplex XY matrix electrode, the liquid crystal layer displays in a dark state with the highest voltage among voltages of at least two values supplied from the driving means, and the phase difference at wavelength 550 nm is determined by any one of the following methods from (a) to (e).

(a) In the equation (1), it is taken as n=1, and a positive sign (+) for the second term.

(b) In the equation (1), it is taken as n=2, and a positive sign (+) for the second term.

(c) In the equation (1), it is taken as n=1, and a negative sign (−) for the second term.

(d) In the equation (1), it is taken as n=2, and a negative sign (−) for the second term.

(e) In the equation (1), it is taken as n=3, and a negative sign (−) for the second term.

Regarding to the optical compensation layer, the wavelength dependency of birefringence is defined by the equation (2), and composed of a laminated layer of two birefringent media, i.e. phase plate A, phase plate B, each of which has a different wavelength dependency of birefringence each other. The phase plates A and B are so set that their slow axises cross over each other, for example perpendicularly, the wavelength dependency of birefringence of the optical compensation layer is set in a range −1.0–0.0, and the retardation of the optical compensation layer at wavelength of 550 nm is set at least 300 nm.

Regarding to the phase plate A, the wavelength dependency of birefringence defined by the equation (2) is set in a range 0.0001–0.1, and the wavelength dependency of birefringence of the phase plate B is set in a range 0.1–0.3.

Further, the retardation of the phase plate A is set larger than that of the phase plate B. An angle formed by a transmitting axis of the polarizer at the light source side and an optical axis of the phase plate A is set at most 30°.

At first of an explanation on operation of the present invention, a method for obtaining high contrast with a liquid crystal display apparatus is briefly explained hereinafter depending on a theory of the present invention and taking a phase plate type STN-LCD as an example.

A liquid crystal display apparatus displays utilizing changes of polarizing state of transmitting light at an ON-state and an OFF-state. Accordingly, it is important to analyze a polarizing state in study of the liquid crystal display apparatus for obtaining high contrast. Here, Stokes parameters (S0, S1, S2, S3) are used for describing the polarizing state. The Stokes parameters are defined by the following equations using X axis component of the polarizing light $E_X$, Y axis component $E_Y$, phase difference of the X axis component and the Y axis component $\delta$.

$$S0 = E_X^2 + E_Y^2 \tag{3}$$

$$S1 = E_X^2 - E_Y^2 \tag{4}$$

$$S2 = 2E_X E_Y \cos\delta \tag{5}$$

$$S3 = 2E_X E_Y \sin\delta \tag{6}$$

When taking normalized Stokes parameters S1', S2', and S3', which are obtained by normalizing S1, S2, and S3 by S0, all polarizing state can be expressed by a combination of normalized Stokes parameters. Further, a following relationship exists among S1', S2', and S3'.

$$S1'^2 + S2'^2 + S3'^2 = 1 \tag{7}$$

That is, any polarizing state corresponds to a point on a sphere having a radius of 1, defined in the space having three axes of S1', S2', and S3' (Poincare sphere). A point on an equator of the Poincare sphere expresses a linear polarizing light, points at two poles express circularly polarized lights having a reverse rotating direction each other, and other points express elliptic polarizing lights. Furthermore, operations of the birefringent media and the phase plate can be evaluated on the Poincare sphere.

Figure 31:
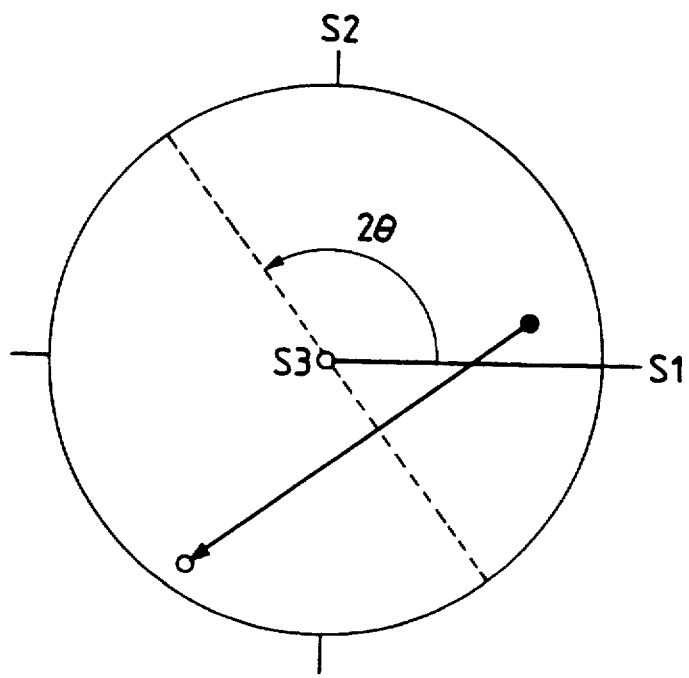
FIG. 31 is a Poincare sphere sighted from a S3 axis direction for explaining effects of birefringent media on polarization.

FIG. 31 illustrates a Poincare sphere sighted from a S3' axis direction, and indicates conversion of a polarizing state by birefringent media. The dotted line is a slow axis of the birefringent media, and the angle 28 on the Poincare sphere corresponds to a slow axis angle 8 in a real space. A black dot in FIG. 31 is a polarizing state of light before incidence into the birefringent media, and a white dot in FIG. 31 is a polarizing state of light after outgoing from the birefringent media. In FIG. 31, the conversion of the polarizing state by a phase plate can be expressed as a linear movement in a perpendicular direction to an axis of the light at the Poincare sphere sighted from the S3' axis direction. A moving distance (the angle $\delta$ on the Poincare sphere) can be expressed by the following equation.

$$\delta(\lambda) = 2\pi \Delta n(\lambda) d/\lambda \tag{8}$$

where, $\Delta n(\lambda)$: Birefringence of phase plate d: Thickness of the phase plate $\lambda$: Wavelength of transmitting light For obtaining a high contrast, it is ideal to concentrate all transmitting polarized light having visible wavelengths in a dark state to a point at an equator on the Poincare sphere. Because, at the above described case, all of the polarizing lights having visible wavelengths become linear polarizing lights having a same vibrating direction and are absorbed completely by polarizers, and a complete dark state can be realized.

The inventors of the present invention determined the polarizing state of light transmitted through the liquid crystal layer with a method for polarized light analysis. The twisted nematic liquid crystal layer was used for a specimen. As a result, it was revealed that the optical characteristics of the twisted nematic liquid crystal layer was close to birefringent, and was preferable for obtaining high contrast.

Figure 2A:
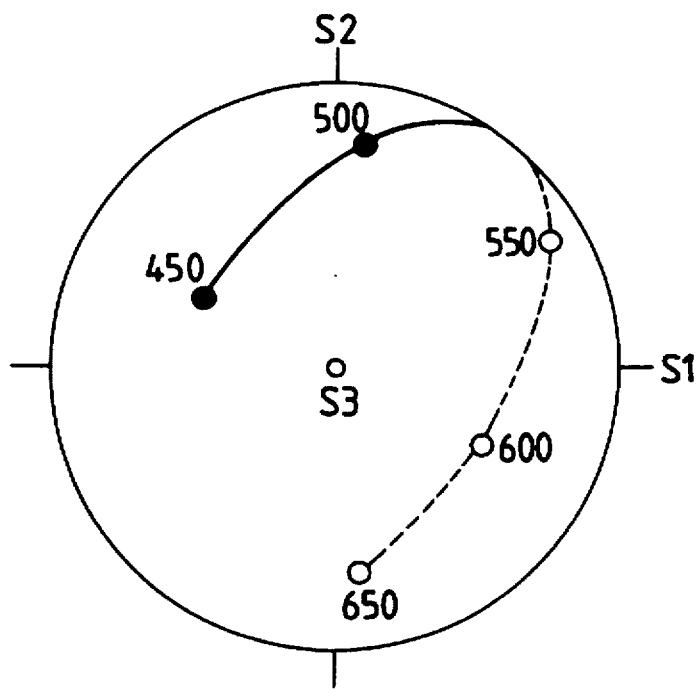
FIG. 2(a) is a drawing for explaining a condition when a threshold voltage is applied.
Figure 2B:
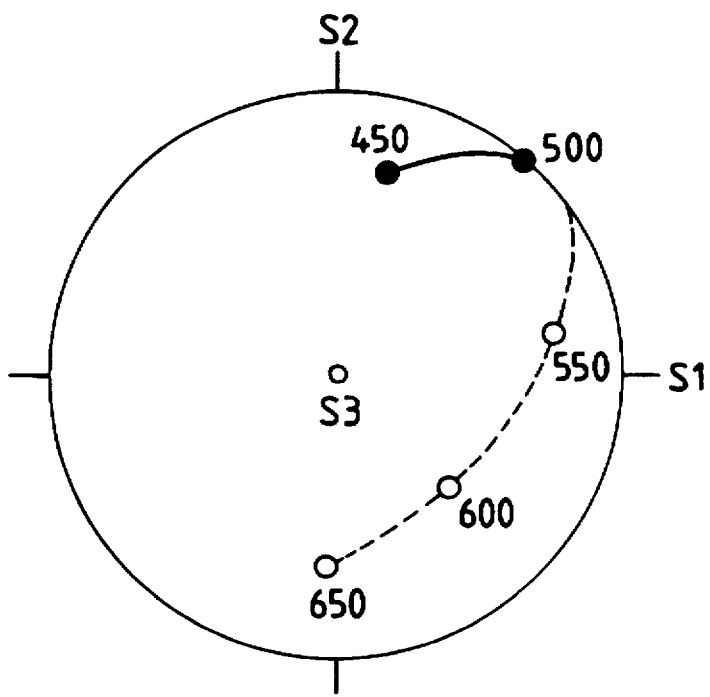
FIG. 2(b) is a condition when a voltage of 1,025 times of the threshold voltage is applied.
Figure 3A:
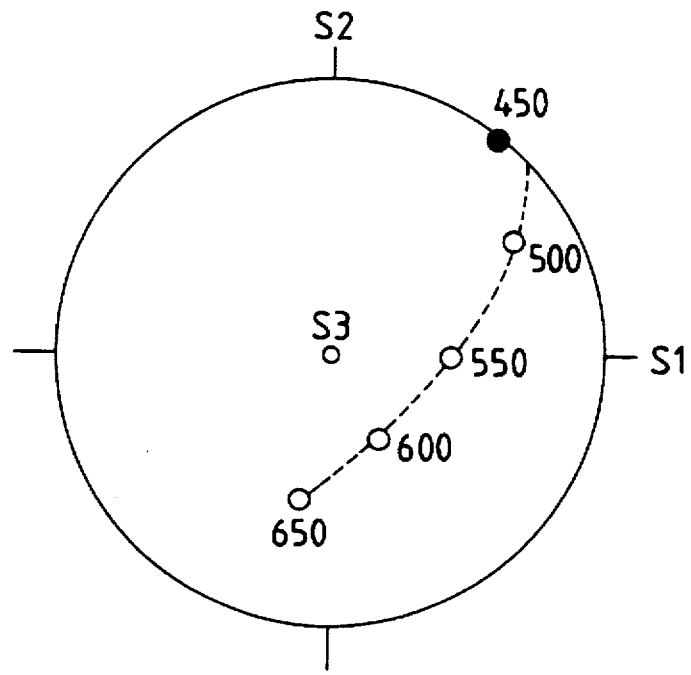
FIG. 3(a) is a drawing for explaining a condition when a voltage of 1.05 times of the threshold voltage is applied.

Wavelength dependency of polarizing light of the transmitting light at a time of transmitting through the liquid crystal layer are illustrated in FIG. 2(a), 2(b), 3(c), 3(d). In FIGS. 2, black dots locate at north semisphere on the Poincare sphere (S3'>0), and white dots locate at south semisphere (S3'<0). FIG. 2(a) is a figure at a time when a threshold voltage is supplied, respective FIGS. 2(b), 3(c), and 3(d) is a figure at a time when a voltage of respective 1.025, 1.05 and 1.075 times of the threshold voltage is supplied. The transmitting light of respective wavelengths does not locate on the equator, but distribute widely on the Poincare sphere and indicates that the state is far from an ideal condition.

The phase plate type STN-LCD is a method for concentrating the transmitting light of respective wavelength to a point on the equator by using a phase plate. As previously explained on the operation of the phase plate, the transmitting light of respective wavelength must be distributed linearly on the Poincare sphere sighted from a direction of S3 axis to concentrate the transmitting light of respective wavelength by using a phase plate. Even in a case using a plurality of phase plates, it is preferable if the transmitting light of respective wavelength is distributed linearly on the Poincare sphere sighted from a direction of S3 axis.

The case when the threshold voltage is supplied as shown in FIG. 2(a), the transmitting light of respective wavelength distributes in an arc shape. However, as the supplied voltage increases as shown in FIGS. 2(b) and 3(c), the distribution of the transmitting light of respective wavelength becomes close to linear, and it becomes almost linear in the case shown in FIG. 3(d).

Accordingly, in a normally open type case wherein a dark state is displayed with the highest voltage among at least two supplied voltages, it is possible to obtain high contrast using a phase plate by adjusting retardation of the phase plate to wavelength dependency of the transmitted polarizing light. Conversion of the normalized Stokes parameters can be expressed by equations of Muller matrixes, and the conversion of the polarization of the present case using a phase plate can be expressed by the following equations.

$$\begin{pmatrix} S1'' \\ S2'' \\ S3'' \end{pmatrix} = \begin{pmatrix} \sin2\theta & -\cos2\theta & 0 \\ \cos2\theta & \sin2\theta & 0 \\ 0 & 0 & 1 \end{pmatrix} \begin{pmatrix} 1 & 0 & 0 \\ 0 & \sin\delta & -\cos\delta \\ 0 & \cos\delta & \sin\delta \end{pmatrix} \begin{pmatrix} \sin2\theta & \cos2\theta & 0 \\ -\cos2\theta & \sin2\theta & 0 \\ 0 & 0 & 1 \end{pmatrix} \begin{pmatrix} S1' \\ S2' \\ S3' \end{pmatrix} \tag{9}$$

Figure 4:
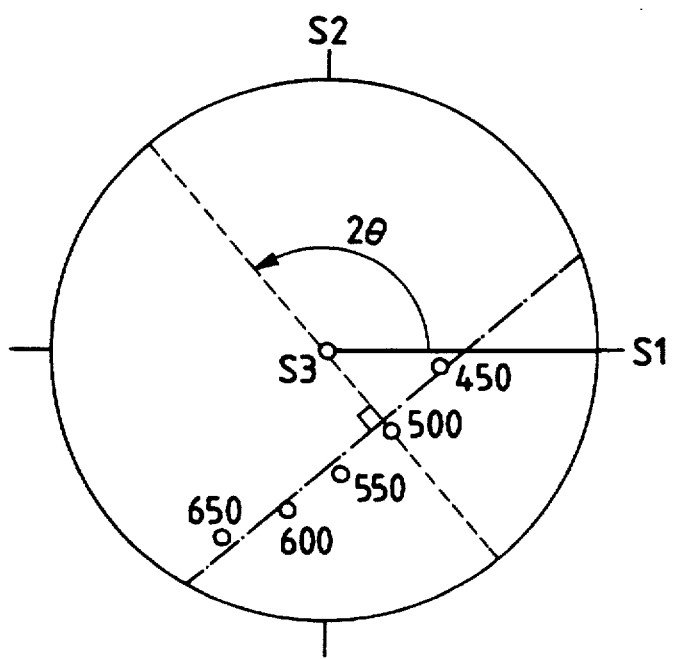
FIG. 4 is a Poincare sphere sighted from a S3 axis direction for indicating a method for determining slow axis angles of birefringent media.

Where, θ is an angle of slow axis of the phase plate, δ is a phase difference of the phase plate (defined by the equation (8)). θ can be obtained from FIG. 2 by a method shown in FIG. 4. A straight line (one dot chain line in FIG. 4) is drawn so as to minimize a sum of deviations from transmitting lights of respective wavelength, and subsequently, a line (a chain line in FIG. 4) is drawn from any point of the straight line (the one dot chain line). An angle formed by the chain line with S1 line in FIG. 4 is 2θ. δ and its wavelength dependency can be determined by the equation (9). As S1', S2', and S3' are located on the equator of the Poincare sphere, S3' equals to zero, and the equation (1) for obtaining δ(λ) can be derived. In the equation (1), a degree is taken as an unit of the phase difference, and arctan is defined in a range 0°–180°.

Figure 37A:
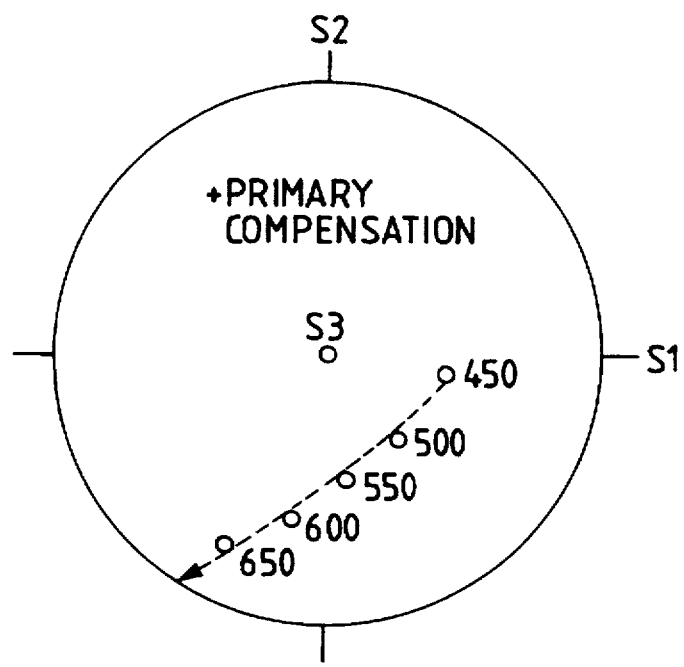
FIG. 37(a) is a drawing for explaining a + primary compensation of the wavelength dependency.
Figure 37B:
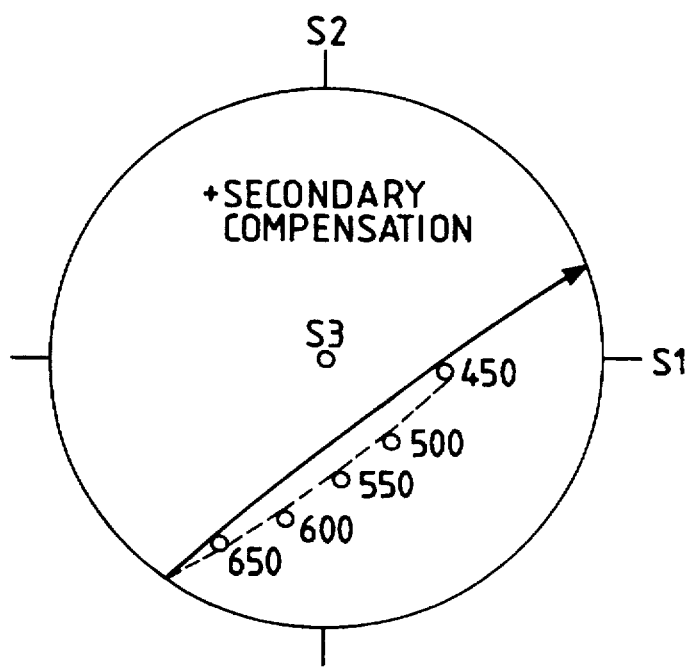
FIG. 37(b) is a drawing for explaining + secondary compensation of the wavelength dependency.
Figure 38A:
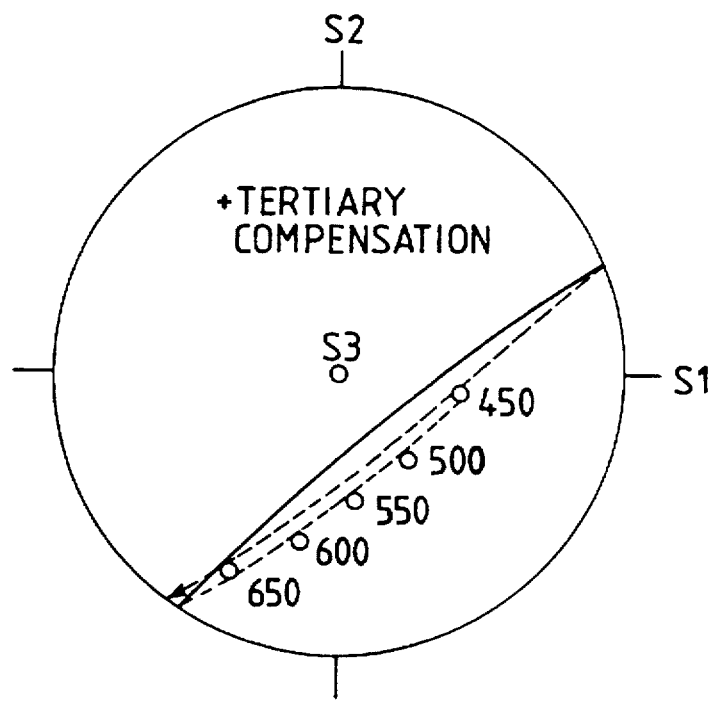
FIG. 38(a) is a drawing for explaining a + ternary compensation of the wavelength dependency.
Figure 38B:
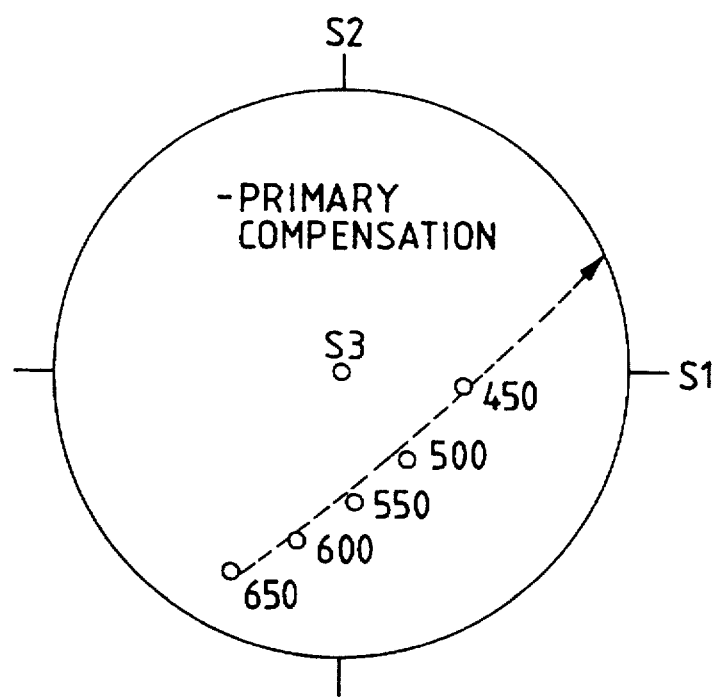
FIG. 38(b) is a drawing for explaining a − primary compensation of the wavelength dependency.
Figure 39A:
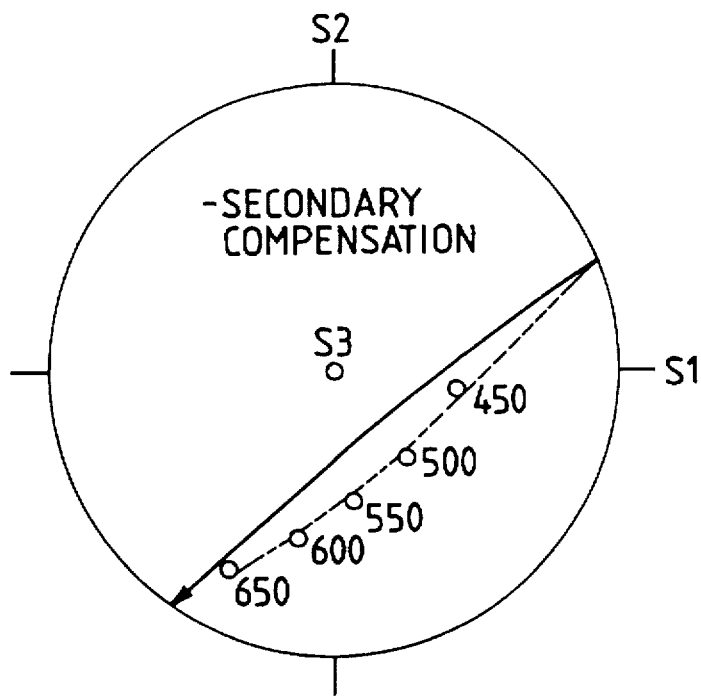
FIG. 39(a) is a drawing for explaining a − secondary compensation of the wavelength dependency.
Figure 39B:
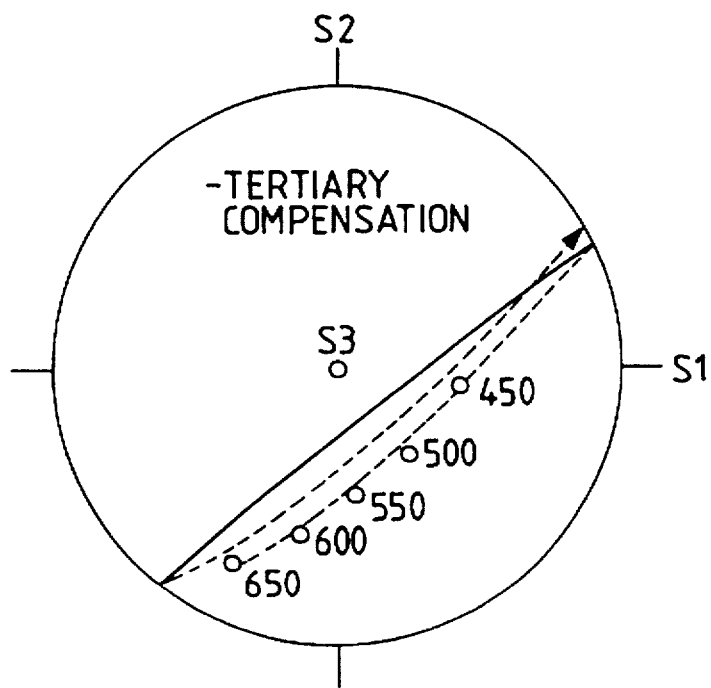
FIG. 39(b) is a drawing for explaining a − ternary compensation of the wavelength dependency.

Although there are many methods for collecting the transmitting light of respective wavelength to points on the equator of the Poincare sphere (compensation), the present invention takes practical six methods for examples, and classifies and names as shown in FIGS. 37–39.

Each of the examples is explained hereinafter.

+ Primary compensation: Collecting the light to points on the equator by rotating the transmitting light of respective wavelength to a direction of the long wavelength side, and restricting the rotated angle of the transmitting light having the longest wavelength at most 180°.

+ Secondary compensation: Collecting the light to points on the equator by rotating the transmitting light of respective wavelength to a direction of the long wavelength side, and restricting the rotated angle of the transmitting light having the longest wavelength to a range 180°–360°.

+ Tertiary compensation: Collecting the light to points on the equator by rotating the transmitting light of respective wavelength to a direction of the long wavelength side, and restricting the rotated angle of the transmitting light having the longest wavelength to a range of 360°–540°.

− Primary compensation: Collecting the light to points on the equator by rotating the transmitting light of respective wavelength to a direction of the short wavelength side, and restricting the rotated angle of the transmitting light having the shortest wavelength at most 180°.

− Secondary compensation: Collecting the light to points on the equator by rotating the transmitting light of respective wavelength to a direction of the short wavelength side, and restricting the rotated angle of the transmitting light having the shortest wavelength to a range 180°–360°.

− Tertiary compensation: Collecting the light to points on the equator by rotating the transmitting light of respective wavelength to a direction of the short wavelength side, and restricting the rotated angle of the transmitting light having the shortest wavelength to a range of 360°–540°.

Based on the above described theory for obtaining high contrast in the phase plate type STN-LCD, an operation of the present invention is explained hereinafter. In this explanation, the operation is explained on a concrete problem solving method as shown in the above means for solving problems.

A dark state is displayed by a driving means with a supplied voltage wherein normalized Stokes parameters (S1', S2', S3') of lights having wavelengths of 450 nm, 500 nm, 550 nm, 600 nm, and 650 nm, respectively, transmitted through the liquid crystal layer distribute linearly on a Poincare sphere sighted from a S3' axis direction. Concretely, taking normalized Stokes parameters for a light of wavelength λ as S1'(λ), S2'(λ), and S3'(λ), a corresponding β is defined by the following equation.

$$\beta = \Sigma((aS1'(\lambda) + b - S2'(\lambda))^2 / (1 + a^2)) \quad (10)$$

A sum of the equation (10) is calculated on each of wavelengths 450 nm, 500 nm, 550 nm, 600 nm, and 650 nm. The a and b in the equation (10) is respectively a coefficient of the line defined by the following equation in a (S1', S2') space.

$$S2' = aS1' + b \quad (11)$$

That is, β is a square sum of deviation of normalized Stokes parameters (S1', S2', S3') for lights having wavelengths 450 nm, 500 nm, 550 nm, 600 nm, and 650 nm from the straight line expressed by the equation (11). The straight line expressed by the equation (11) defining a and b so as to minimize β is called as a regression line 51, and is indicated as 51 in FIG. 1. In this case, β becomes a parameter indicating a degree of linear alignment of the normalized Stokes parameters (S1', S2', S3') for lights of respective wavelength on the Poincare sphere sighted from a S3' axis direction.

Figure 32:
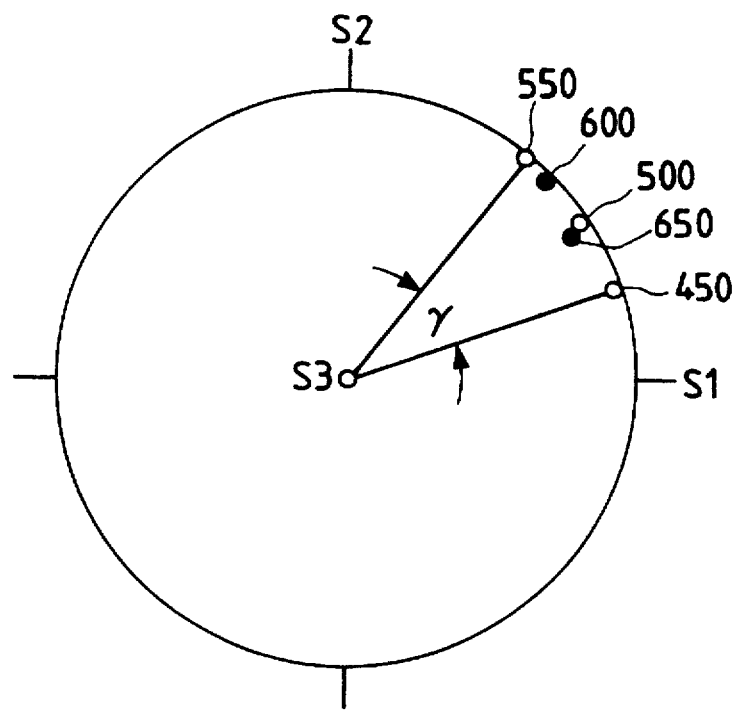
FIG. 32 is a Poincare sphere sighted from a S3 axis direction for explaining a definition of an angle $\gamma$.
Figure 33:
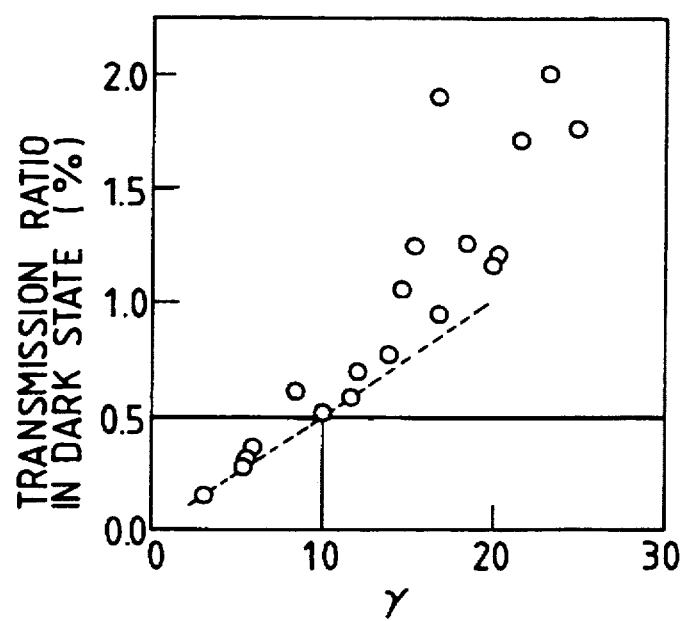
FIG. 33 is a graph indicating a relationship between a transmission ratio in a dark state and the angle $\gamma$.

A distribution angle γ of light having wavelengths of 450 nm, 500 nm, 550 nm, 600 nm, and 650 nm, respectively, at the equator on the Poincare sphere is defined in FIG. 32. In FIG. 33, a relationship between γ and a transmission ratio in a dark state is shown. FIG. 33 reveals that there is a proportional relationship between γ and a transmission ratio in a dark state. Taking a phase plate type STN-LCD for an example, a transmission ratio in its bright state is at most 18% at the present. Under the above described condition, the transmission ratio in a dark state must be less than 0.5% in order to obtain higher contrast ratio than that of the present phase plate type STN-LCD. In accordance with FIG. 33, if γ is equal to or less than 10 degrees, the transmission ratio in a dark state becomes equal to or less than 0.5%. In order to decrease γ equal to or less than 10 degrees, a display in a dark state must be performed with a supplied voltage which makes β at most 0.01.

Next, an operation of the optical compensation layer having a wavelength dependency of retardation matched to the wavelength dependency of retardation for the liquid crystal in the above described voltage applied condition is explained hereinafter.

The optical compensation layer is so set that a slow axis, which is defined as one of two optical main axises in its plane having a refractive index larger than that of the other, crosses perpendicularly over the regression line shown as 52 in FIG. 1 on the Poincare sphere sighted from a S3' axis direction.

The optical compensation layer having a wavelength dependency of retardation matched to the wavelength dependency of retardation for the liquid crystal in a voltage applied condition is determined as following steps.

An angle formed by the above described slow axis S2 with the S1' axis at a point on the Poincare sphere sighted from the S3' axis direction is expressed as 2θ. Retardation of transmitted light through the twisted nematic liquid crystal layer having a wavelength λ is expressed as Δnd(λ), and obtained by the equation (9). Birefringence of the respective phase plate A and B to light having a wavelength k is expressed as $\Delta n_a(\lambda)$ and $\Delta n_b(\lambda)$, and thickness of the respective phase plate A and B is expressed as $d_a$ and $d_b$. An a is defined by the following equation using the above Δnd(λ), $\Delta n_a(\lambda)$, $\Delta n_b(\lambda)$, $d_a$, and $d_b$.

$$a = \Sigma(\Delta nd(\lambda) - \Delta n_a(\lambda)d_a - \Delta n_b(\lambda)d_b)^2 \quad (12)$$

A sum of the equation (12) is calculated on the cases where X equals to 450 nm, 500 nm, 550 nm, 600 nm, and 650 nm, respectively. $|d_a|$, $|d_b|$ are set as the values obtained by $\partial a/\partial d_a=0$, $\partial a/\partial d_b=0$. In accordance with the above steps, the transmitting light having various wavelengths can be converted to a linear polarizing light having a same vibration direction.

When points on the Poincare sphere where the above regression line crosses over the equator sighted from the S3' axis direction are designated as the point A and the point B, an absorbing axis of the top polarizer is set in an angle so as to pass over any of the point A or the point B as shown as 53 in FIG. 1. By the above procedure, the transmitting light converted to the linear polarizing light having the same vibration direction by the optical compensation layer can be absorbed almost completely, and the transmitting light in a dark state can be decreased.

In accordance with the above described process, high contrast in the phase plate type STN-LCD can be realized.

Furthermore, when a twisted nematic liquid crystal layer is applied to the liquid crystal layer of the liquid crystal display apparatus relating to the present invention and a twisted angle of the twisted nematic liquid crystal is set in an angle in a range 180°–270°, a large volume, superfine display can be realized.

Therefore, an evaluation what twisted nematic liquid crystal layer can be used for realizing a display in a dark state with an applied voltage which makes β equal to or less than 0.01 is performed hereinafter.

A transmission ratio in a bright state when a transmission ratio in a dark state decreased can be determined with a Δ parameter defined by the following equation.

$$\Delta \text{ parameter}=0.5(1-S1'_{ON}S1'_{OFF}-S2'_{ON}S2'_{OFF}-S3'_{OFF}) \quad (13)$$

Taking that a display in a bright state is performed when the voltage $V_{ON}$ is applied and a display in a dark state is performed when the voltage $V_{OFF}$ is applied $S1'_{ON}$, $S2'_{ON}$, and $S3'_{ON}$ in the equation (13) are normalized Stokes parameters of the transmitting light through the twisted nematic liquid crystal layer when the voltage $V_{ON}$ is applied. Similarly, $S1'_{OFF}$, $S2'_{OFF}$, and $S3'_{OFF}$ are the normalized Stokes parameters when the voltage $V_{OFF}$ is applied. The Δ parameter depends upon a product, $\Delta n_{LC}d_{LC}$, of birefringence of the liquid crystal, $\Delta n_{LC}$, and a thickness of the twisted nematic liquid crystal layer, $d_{LC}$.

Figure 34:
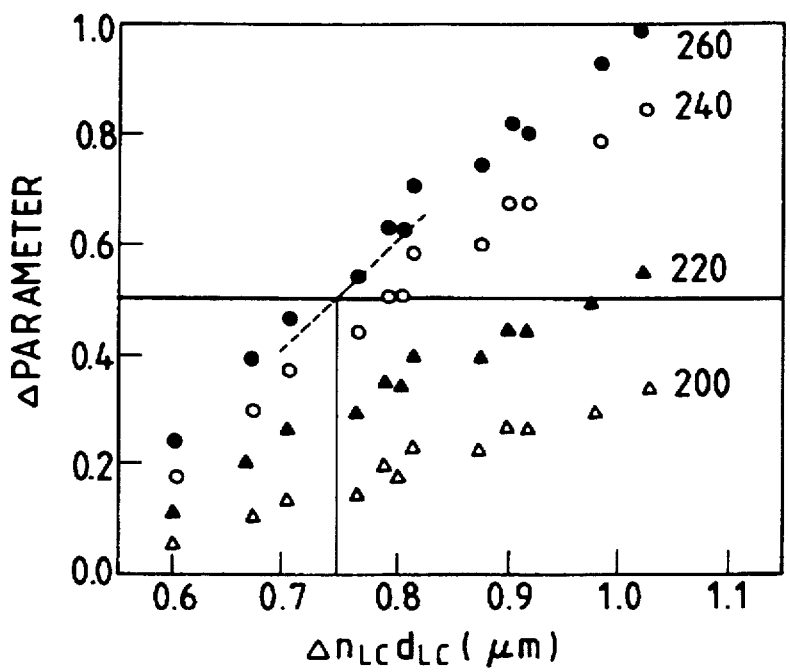
FIG. 34 is a graph indicating a relationship between a $\Delta$ parameter and a product $\Delta n_{LC} d_{LC}$ of a layer thickness and birefringence of the twisted nematic liquid crystal layer.

FIG. 34 indicates a relationship between the highest value of the Δ parameters for the transmitting light having a wavelength of 550 nm and the product, $\Delta n_{LC}d_{LC}$. The white triangles in FIG. 34 indicate data when the twisted angle is 200°, black triangles are for 220°, white circles are for 240°, black circles are for 260°, respectively. The numbers in FIG. 34 indicate the twisted angles, respectively. The maximum value of the Δ parameters for the transmitting light having a wavelength of 550 nm of the present phase plate type STN-LCD is 0.5–0.6. According to FIG. 34, it is revealed that the maximum value of the Δ parameters for the transmitting light having a wavelength of 550 nm can exceed that of the present phase plate type STN-LCD when $\Delta n_{LC}d_{LC}$ is larger than about 0.75 μm. In other words, in order to obtain an almost same transmission ratio for a display in a bright state as that of the present phase plate type STN-LCD, the product, $\Delta n_{LC}d_{LC}$, at least 0.75 μm is sufficient.

Figure 35:
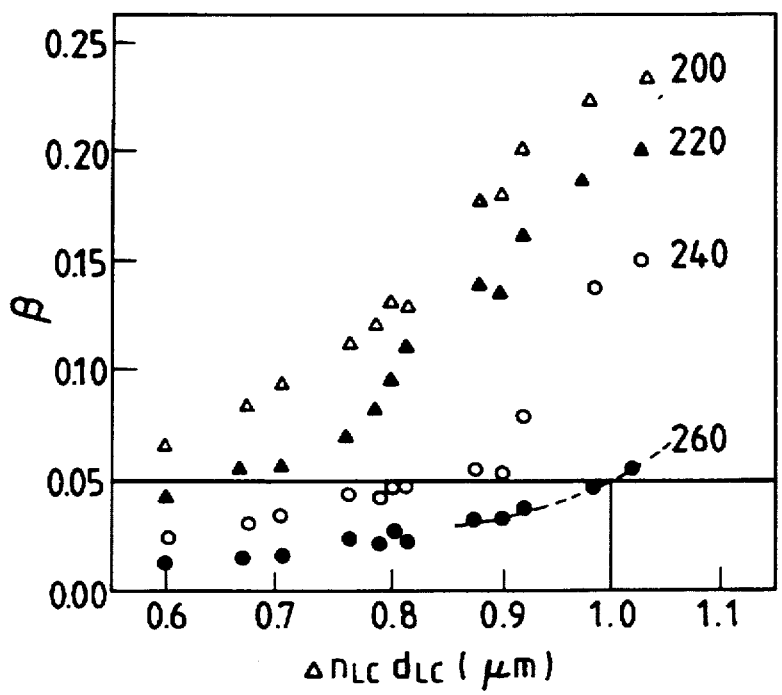
FIG. 35 is a graph indicating a relationship between $\beta$ and $\Delta n_{LC} d_{LC}$.

Also, a value of β when the voltage $V_{OFF}$ which gives the highest value of the Δ parameters is applied depends on the product, $\Delta n_{LC}d_{LC}$. A relationship between β and the product, $\Delta n_{LC}d_{LC}$, is indicated in FIG. 35. Definitions of the marks and numbers in FIG. 35 are the same as that in FIG. 34. When the product, $\Delta n_{LC}d_{LC}$, is equal to or less than 1.0 μm, β becomes equal to or less than 0.01.

In accordance with data explained above referring to FIGS. 34 and 35, it is concluded that the product, $\Delta n_{LC}d_{LC}$, Of the twisted nematic liquid crystal layer in a range 0.75–1.0 μm is preferable.

Furthermore, a large volume, superfine display with a low cost becomes possible when a multiplex driving type XY matrix electrode is applied to the electrode of the liquid crystal display apparatus relating to the present invention.

Retardation and birefringence of the optical compensation layer which is necessary for each compensation can be obtained by calculation of δ for light having each wavelength using the equation (1). First, wavelength dependency of birefringence for the optical compensation layer which is necessary for + primary compensation is obtained based on data shown in FIG. 2. Here, a value for n and a sign for the second term in the equation (1) must be determined. As an experimental result, it is revealed that a transmitting light having a wavelength of 550 nm locates at southern semisphere of a Poincare sphere. That means, if Stokes parameters for the transmitting light having a wavelength of 550 nm is effected with the first Muller matrix in the equation (9) and, subsequently, projected to a (S2, S3) plane, the Stoked parameters locate in the third quadrant or fourth quadrant. In addition to this fact, a rotating direction and a number of rotations are considered in connection with the + primary compensation, and a conclusion as shown in the following (i) is obtained regarding to the value for n and the sign for the second term on δ of wavelength 550 nm.

(i) n=0, the sign for the second term: +

Figure 5:
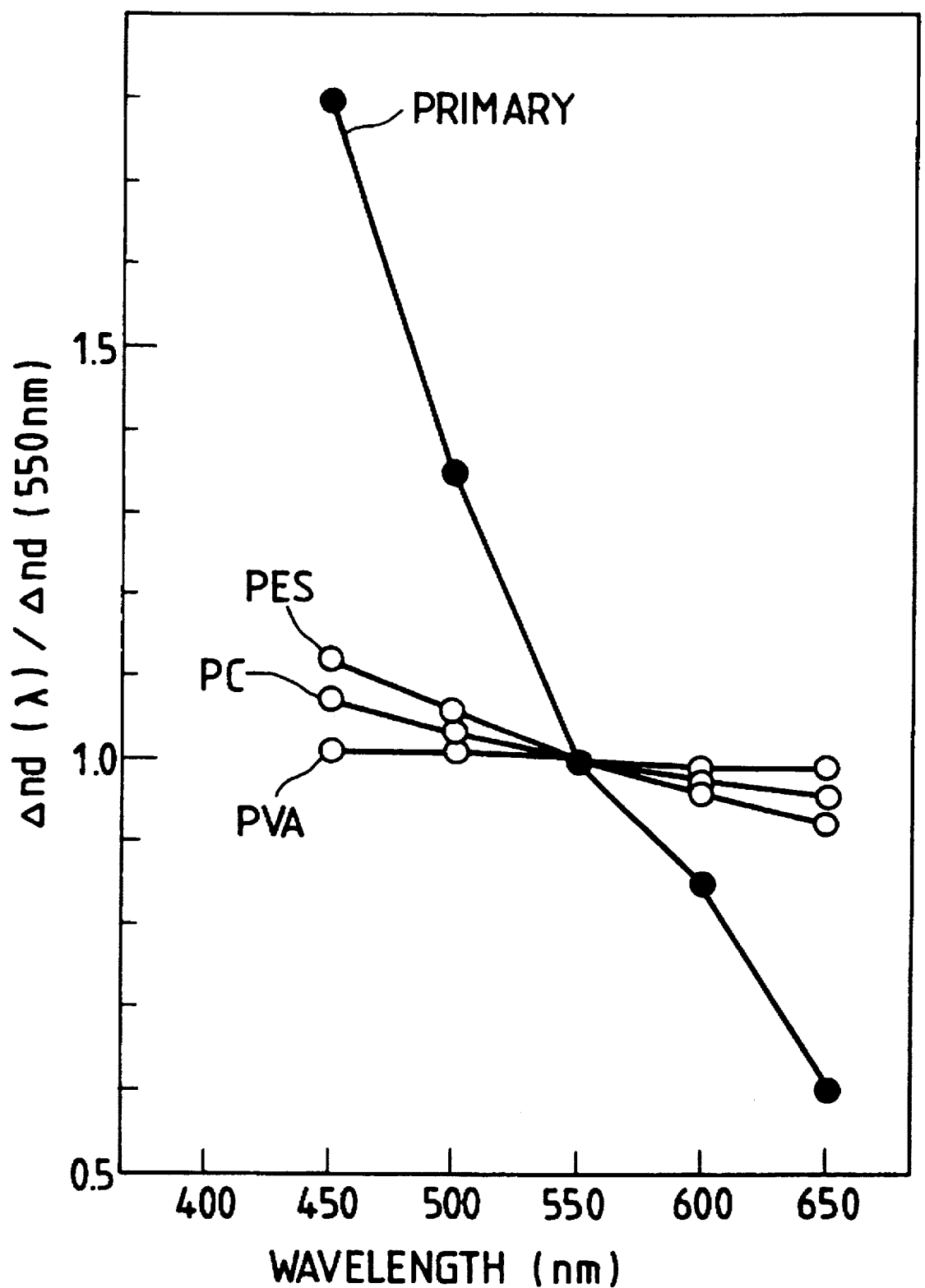
FIG. 5 is a graph indicating wavelength dependency of retardation for birefringent media necessary for + primary compensation, polyether sulfone, polycarbonate, and polyvinyl alcohol (The values of the retardation are normalized by a value at the wavelength 550 nm)

Obtained results are normalized by the wavelength of 550 nm, and are indicated by black dots in FIG. 5. High contrast of the phase plate type STN-LCD can be realized by setting wavelength dependency of birefringence of birefringent media as the black dots in FIG. 5.

If the wavelength dependency of birefringence is defined by the equation (2), a value for the wavelength dependence of birefringence of the birefringent media necessary for the + primary compensation as shown by black dots in FIG. 5 is about 1.2.

Next, methods for realizing birefringent media having such wavelength dependency of birefringence are related.

The wavelength dependency of birefringence has a tendency to increase with increasing a product, dΔn, of a layer thickness d and birefringence Δn of the twisted nematic liquid crystal layer, and with decreasing a twisted angle of the twisted nematic liquid crystal layer. When the + primary compensation is performed with dan and the twisted angle in a practical range (700 nm<dΔn<1000 nm, 200°<twisted angle<270°), the wavelength dependency of birefringence of the optical compensation layer must be in a range 0.5–3.0.

The above wavelength dependency of birefringence is a extremely large value. In order to compare with this value, some wavelength dependency of birefringence of some organic high polymers are indicated by white circles in FIG. 5. In FIG. 5, PES means polyether, PC means polycarbonate, and PVA means polyvinyl alcohol, respectively. Gradient of the wavelength dependency of birefringence of the optical compensation layer necessary for the + primary compensation is extremely steep in comparison with that of the above described organic high polymers. Values of wavelength dependency of birefringence defined by the equation (2) are about 0.25 for polyether, about 0.20 for polycarbonate, and about 0.03 for polyvinyl alcohol.

In order to realize the above described wavelength dependency of birefringence, the optical compensation layer is composed of two birefringent media (phase plate A, phase plate B) having different wavelength dependency of birefringence each other. When the wavelength dependency of birefringence of the respective phase plate A and phase plate B is expressed by $\Delta n_a(\lambda)$ and $\Delta n_b(\lambda)$, and thickness of the respective phase plate A and phase plate B is expressed by $d_a$ and $d_b$, $\Delta n(\lambda)$ of the optical compensation layer which is composed by laminating the phase plate A and the phase plate B in a manner crossing over perpendicularly each other can be expressed by the following equation.

$$\Delta n(\lambda) = |((\Delta n_a(\lambda) d_a - \Delta n_b(\lambda) d_b)/(d_a + d_b))| \quad (14)$$

The equation (14) can consist for all wavelength, and accordingly, wavelength dependency of birefringence of the optical compensation layer which is composed by laminating the phase plate A and the phase plate B in a manner crossing over perpendicularly each other can be expressed by the following equation.

$$\text{Wavelength dependency of birefringence} = ((\Delta n_{aB} d_a - \Delta n_{bB} d_b) - (\Delta n_{aR} d_a - \Delta n_{bR} d_b))/(\Delta n_{aG} d_a - \Delta n_{bG} d_b)) \quad (15)$$

Where, $\Delta n_{aR}$, $\Delta n_{aG}$, $\Delta n_{aB}$ is respective birefringence of the phase plate A with each of wavelength 650 nm, 550 nm, and 450 nm, and $\Delta n_{bR}$, $\Delta n_{bG}$, $\Delta n_{bB}$ is respective birefringence of the phase plate B with each of wavelength 650 nm, 550 nm, and 450 nm. In order to make a value of the equation (15) larger than any of the wavelength dependency of birefringence of the phase plate A and the phase plate B, the phase plate A and the phase plate B must satisfy the following equation.

$$(\Delta n_{aB} - \Delta n_{aR})/\Delta n_{aG} > (\Delta n_{bB} - \Delta n_{bR})/\Delta n_{bG} \quad (16)$$

Furthermore, phase difference of transmitting light and its wavelength dependency can be compensated by setting retardation of the optical compensation layer at a value in a range 50 nm–200 nm. Accordingly, an optical compensation layer having rapid wavelength dependency of birefringence can be obtained, and a phase plate type STN-LCD having a high contrast can be realized.

A black matrix provided to a transparent base plate is particularly effective for a normally open phase plate type STN-LCD which performs a display in a dark state with the highest voltage among at least two voltages applied by a driving means. That is, liquid crystals in a part which is not covered with any electrode are always in a condition of applied voltage zero. In a case of normally open type, the condition of applied voltage zero causes a high transmission ratio close to a bright state. Accordingly, light leakage is caused from the portion which does not have any electrode. Consequently, a contrast ratio averaged for the portion of picture elements and the portion of non picture elements decreases. In order to prevent the above described decrease, a transparent base plate having a black matrix for covering the portion of non picture elements is used. In accordance with the above described countermeasure, the light leakage at the display in a dark state can be prevented, and a phase plate type STN-LCD having an enhanced high contrast can be realized.

Next, a viewing angle performance is one of the important display characteristics. Increase in values of $\Delta n_a(\lambda) d_a$, $\Delta n_b(\lambda) d_b$ causes detrimental effects to the viewing angle performance of the phase plate type STN-LCD. In order to suppress the increase in values of $\Delta n_a(\lambda) d_a$, $\Delta n_b(\lambda) d_b$, wavelength dependency of birefringence of the phase plate A and the phase plate B must differ significantly each other. Wavelength dependency of $\Delta n(\lambda)$ can be expressed approximately by the following equation.

$$\Delta n(\lambda) = a + b/(\lambda^2 - \lambda_o^2) \quad (17)$$

Where, a is a dimensionless constant number, and b is a constant number having a dimension of $1/m^2$, $\lambda O$ is a resonance wavelength of absorption which effects most significantly to $\Delta n(\lambda)$ in a visible wavelength region. In a case of a transparent organic polymer, $\lambda_o$ is in a near ultraviolet wavelength region, and wavelength dependency of birefringence has a positive sign. When $\lambda_o$ is in a visible wavelength region, wavelength dependency of birefringence has a large positive value in comparison with that of a transparent organic polymer, or a negative value, and an organic polymer in this case is not transparent. In order to satisfy both transparency and viewing angle performance, wavelength dependency of birefringence of the phase plate A is set in a range 0.0001–0.1, and that of the phase plate B is set in a range 0.1–0.3.

As for the phase plate A, acryl group high polymers such as poly methyl methacrylate, polyvinyl alcohol, and polypropylene are preferable. As for the phase plate B, polycarbonate, polyether, and polyethylene terephthalate are preferable.

Acryl group high polymers such as poly methyl methacrylate, and polyvinyl alcohol and others have poor weatherability. Accordingly, it is necessary to protect its surface by covering with protecting film such as TAC film as same as the polarizer. However, as the TAC film has almost the same thickness (about 100 nm) as that of the phase plate, the covering increases thickness of the phase plate and is not preferable. Therefore, the phase plate A is held between the polarizer and the phase plate B, and the above three plates are integrated. That means, the phase plate A can be made thin by using the polarizer and the phase plate B as the protecting film.

In accordance with the method described above, the optical compensation layer having wavelength dependency of birefringence can be obtained, and the phase plate type STN-LCD having an enhanced high contrast can be realized. Furthermore, in the above described case, the viewing angle performance can be maintained almost same as that of a conventional phase plate type STN-LCD, and side reactions such as coloring and decrease of transmission ratio do not occur.

In order to make the equation (15) have a positive sign, the phase plate A and the phase plate B must satisfy the following equation.

$$(\Delta n_{aB} - \Delta n_{aR})/(\Delta n_{bB} - \Delta n_{bR}) > d_b/d_a \quad (18)$$

That is, the optical compensation layer having wavelength dependency of birefringence can be obtained by setting the retardation of the phase plate A and the phase plate B so as to satisfy the following equation at wavelength of 550 nm, and the phase plate type STN-LCD having an enhanced high contrast can be realized.

$$\Delta n_{aG} d_a > \Delta n_{bG} d_b \quad (19)$$

In order to obtain a sufficient transmission ratio in a bright state when a contrast ratio is increased, various conditions are required for arranging the phase plates, and liquid crystal layer, etc. Regarding to an arrangement of the phase plate at a light source side, an angle formed by a transmitting axis of the phase plate and an orientating direction of the closing base plate must be 45°±5°. Under the above described condition, wavelength dependency of the polarizing light transmitted through the liquid crystal layer is evaluated on the Poincare sphere. Here, a synthesizing direction of rubbing vector is selected as an angle zero, that is, $S_1$ axis. An angle of transmitting axis of the polarizer at the light source side becomes 75°±5° based on the above described definition of the angle.

Figure 3B:
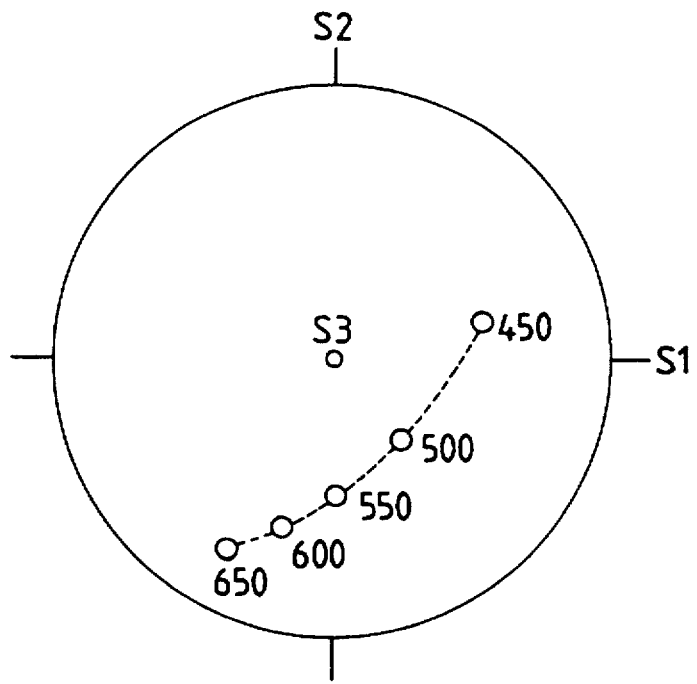
FIG. 3(b) is a condition when a voltage of 1,075 times of the threshold voltage is applied.

Light having respective wavelength are distributed almost linearly on a Poincare sphere sighted from a $S_3$ axis direction when high voltage is applied as an example is shown in FIG. 3.

The above described distribution is determined with $d\Delta n$ and the twisted angle in a practical range (700 nm<$d\Delta n$<1000 nm, 200°<twisted angle<270°), and a straight line which makes sum of deviation from the points corresponding to each wavelength minimum is obtained. The straight line crosses over the $S_1$ axis with an angle in a range 0°–70°.

In order to compensate such a wavelength dependency of the polarizing light, it is necessary to set a slow axis of the optical compensation layer so as to cross over the regression line, preferably perpendicularly, on the Poincare sphere sighted from the $S_3$ axis direction. That is, an angle formed by the slow axis of the optical compensation layer and the $S_3$ axis must be set in a range 90°–160°. That angle can be converted to an angle in a practical space as 45°–80°, and also the angle can be converted to an angle formed with a transmitting axis of the polarizer at the light source side as 0°–30°.

As explained above, the wavelength dependency of polarizing light transmitted through the liquid crystal layer can be completely compensated by setting an angle formed by a transmitting axis of the polarizer at the light source side with the slow axis of the optical compensation layer at most 30°, and a phase plate type STN-LCD having an enhanced high contrast can be realized.

Next, wavelength dependency of birefringence of the optical compensation layer which is necessary for respective compensation of + secondary, + tertiary, − primary, − secondary, − tertiary is obtained by using data shown in FIG. 2. First, a value for n and a sign for the second term in the equation (1) must be determined as same as the previous explanation. The values for n and the signs for the second term regarding to δ of wavelength 550 nm are obtained as the following (ii) for + secondary, (iii) for + tertiary, (iv) for − primary, (v) for − secondary, (vi) for − secondary, and (vi) for − tertiary compensation, respectively.

(ii) n=1, the sign for the second term: +
(iii) n=2, the sign for the second term: +
(iv) n=1, the sign for the second term: −
(v) n=2, the sign for the second term: −
(vi) n=3, the sign for the second term: −

Figure 6:
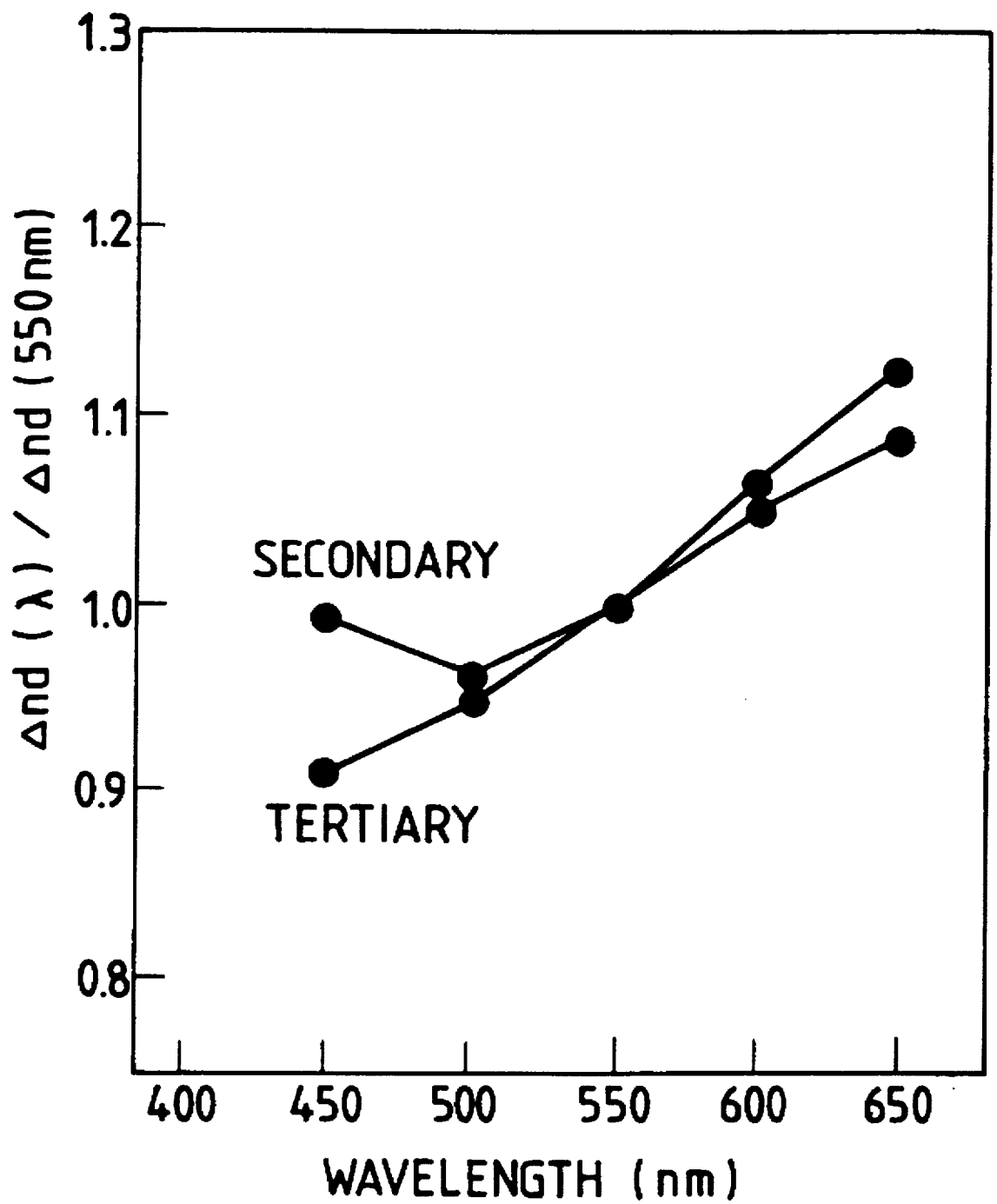
FIG. 6 is a graph indicating wavelength dependency of retardation for birefringent media necessary for + secondary compensation, and + tertiary compensation, respectively (The values of the retardation are normalized by a value at the wavelength 550 nm)
Figure 7:
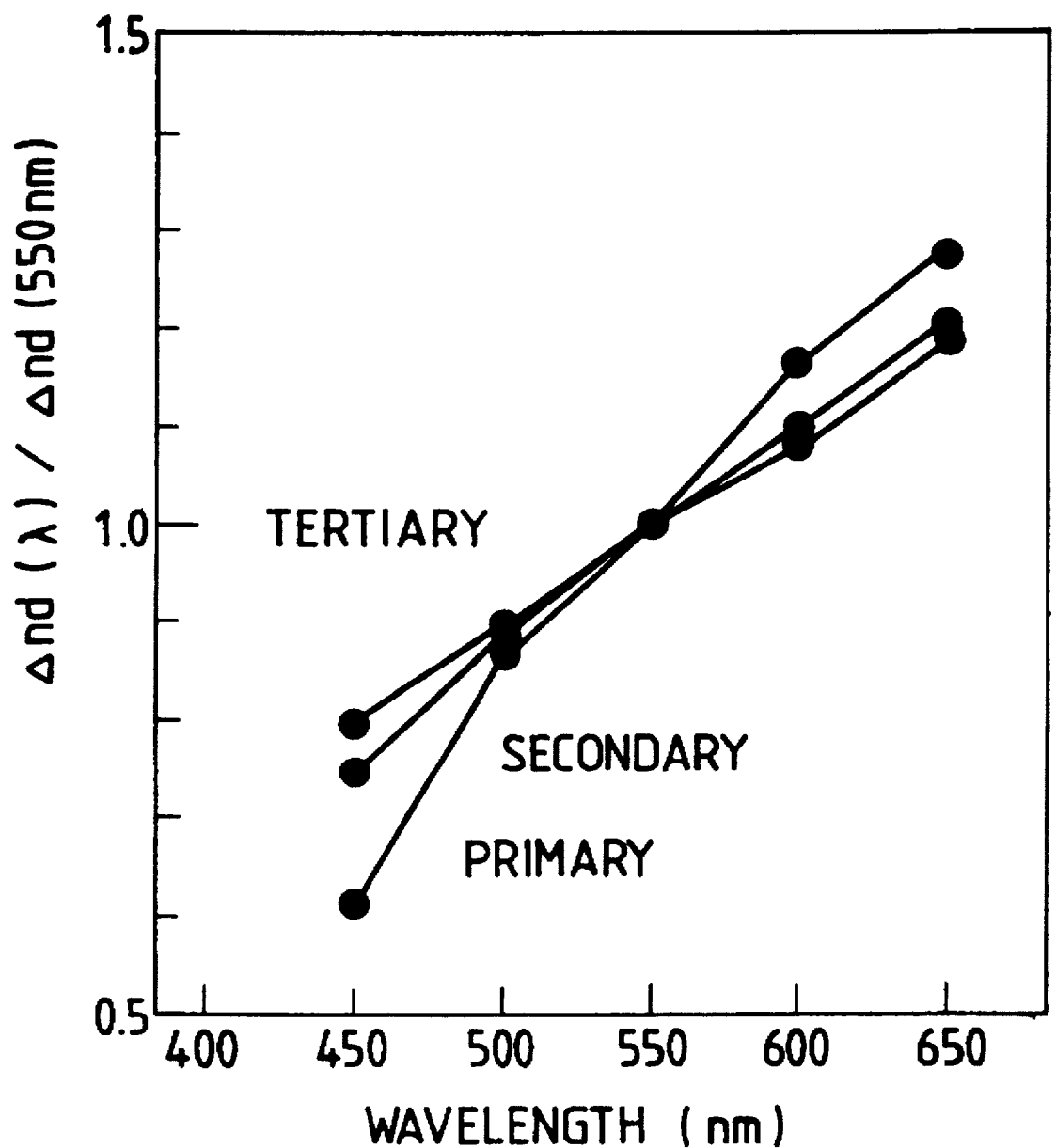
FIG. 7 is a graph indicating wavelength dependency of retardation for birefringent media necessary for − primary compensation, − secondary compensation, and − tertiary compensation, respectively (The values of the retardation are normalized by a value at the wavelength 550 nm)

Obtained results on + secondary compensation and + tertiary compensation are normalized by the wavelength of 550 nm, and are indicated in FIG. 6. Similarly, obtained results on − primary compensation, − secondary compensation, and − tertiary compensation are shown in FIG. 7. High contrast enhancement of the phase plate type STN-LCD can be realized by setting wavelength dependency of birefringence of birefringent media as shown in FIGS. 6 and 7.

When wavelength dependency of birefringence is defined by the equation (2), values for + secondary and + tertiary compensation are −0.09 and −0.21, respectively, and values for − primary, − secondary, and − tertiary compensation are −0.66, −0.45, and −0.38, respectively. Next, methods for realizing birefringent media of the wavelength dependency of birefringence are evaluated.

The wavelength dependency of birefringence has a tendency to increase according to increase of the product $d\Delta n$ of a layer thickness d and birefringence $\Delta n$ of the twisted nematic liquid crystal layer, and to decrease of a twisted angle of the twisted nematic liquid crystal layer. In a case when + primary compensation is performed with $d\Delta n$ and the twisted angle in a practical range (700 nm<$d\Delta n$<1000 nm, 200°<twisted angle<270°), wavelength dependency of birefringence of the optical compensation layer must be in a range −1.0– 0.0.

Wavelength dependency of birefringence of a several organic polymers are exemplified as about 0.25 for polyether sulfone, about 0.20 for polycarbonate, and about 0.03 for polyvinyl alcohol, and all of them are positive wavelength dependency of birefringence. In order to realize negative wavelength dependency of birefringence, the optical compensation layer is composed of two birefringent media (phase plate A, phase plate B) having different wavelength dependency of birefringence each other. Wavelength dependency of birefringence of the optical compensation layer composed by laminating the phase plates A and the phase plate B so that their slow axises are crossed over each other perpendicularly can be expressed by the equation (16), and the phase plate A and the phase plate B must satisfy the following equation in order to make the value of the equation (16) negative.

$$(\Delta n_{aB} - \Delta n_{aR})/(\Delta n_{bB} - \Delta n_{bR}) < d_b/d_a \qquad (20)$$

Furthermore, phase difference of transmitting light and its wavelength dependency can be compensated by setting retardation of the optical compensation layer at wavelength of 550 nm at a value more than 300 nm. Accordingly, an optical compensation layer having negative wavelength dependency of birefringence can be obtained, and a phase plate type STN-LCD having an enhanced high contrast can be realized.

Figure 40:
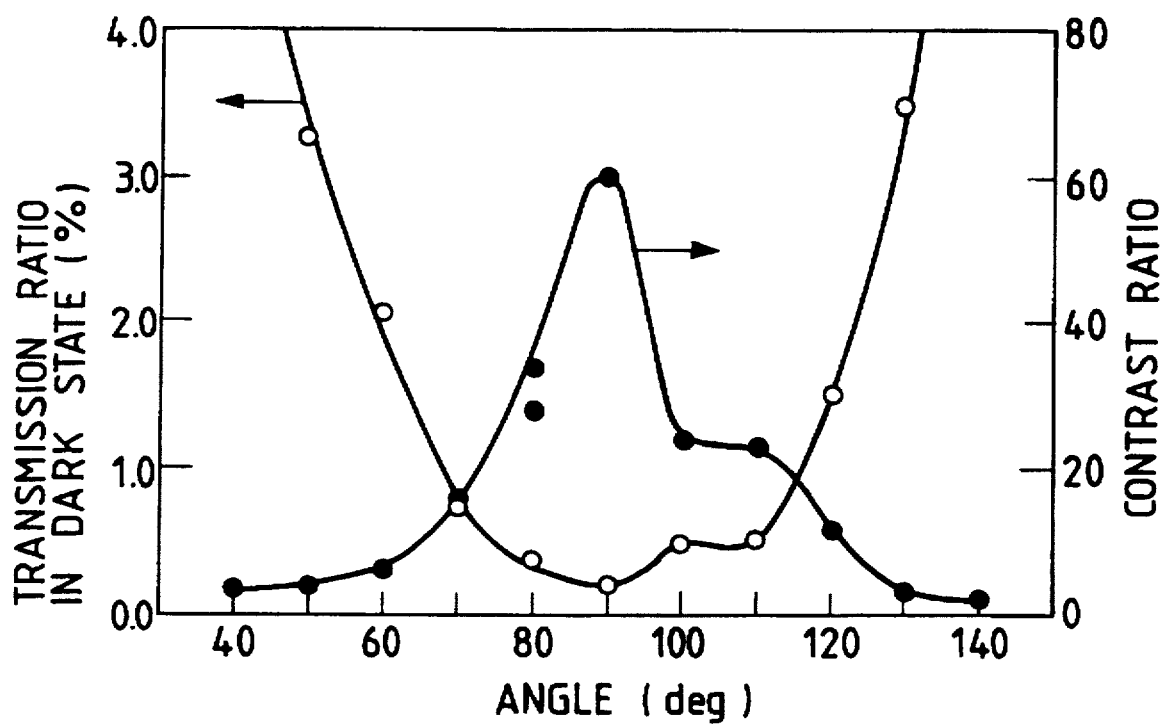
FIG. 40 is a graph indicating relationships between a crossing angle, which is used for optimization of the phase plates A and B, and a transmission ratio in a dark state, and a contrast ratio, respectively.

Here, an effective range for crossing angles of the slow axis of the above optical compensation layer with a regression line is evaluated. The effective range for the above crossing angle is shown in FIG. 40. In FIG. 40, the crossing angle is changed stepwise in a range 40°–140°, the phase plate A and the phase plate B are optimized at each step, and a transmission ratio in a dark state and a contrast ratio at the step is plotted. As FIG. 40 reveals, the transmission ratio in a dark state takes the minimum value at the crossing angle near 90°, and decrease in the contrast ratio in a range 90°± 10° is about 50% of the maximum value. Accordingly, the preferable crossing angle is as perpendicular as possible in a range 70°–110°.

In a liquid crystal display apparatus, the liquid crystal layer contains a large number of beads in order to keep gaps between the base plates constant. The bead is usually composed of plastics, silicone sphere and so on, and is generally transparent. Therefore, there may be some cases wherein light leaks through the beads. Further, liquid crystal molecules around the beads cause turbulence in their orientation, and form special domains having different optical characteristics from that of the other region. Regions of the above special domains transmit light even in a dark state, and accordingly, light leaks through the regions of the special domains.

Regarding to a problem of the light leakage through the beads, the present invention resolved the problem by making the beads opaque by blackening and so on. Further, a high voltage applying method is used for solving the problem regarding to the domain around the beads.

Figure 41:
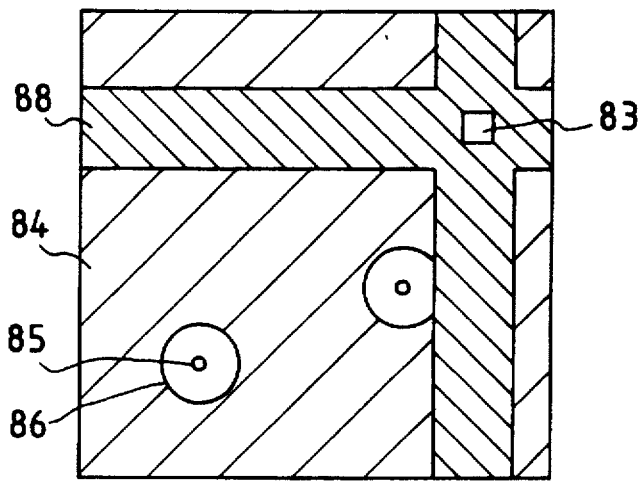
FIG. 41 is an enlarged plan view indicating light leakage through a liquid crystal layer using transparent beads.
Figure 42:
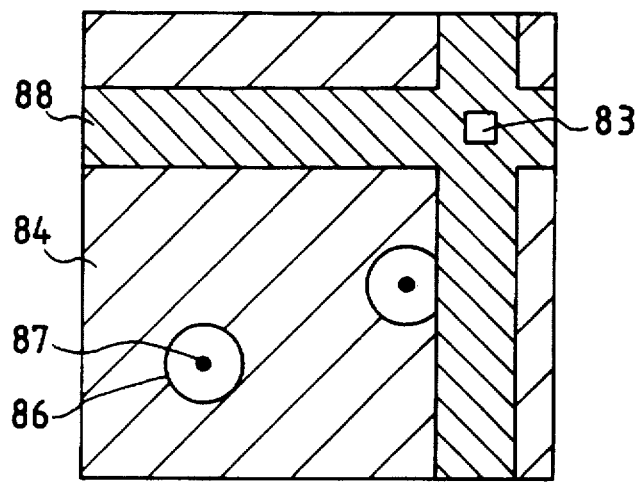
FIG. 42 is an enlarged plan view indicating light leakage through a liquid crystal layer using black beads.
Figure 43:
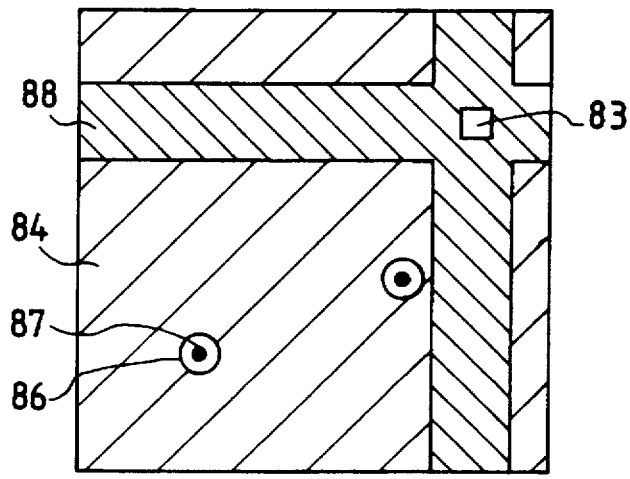
FIG. 43 is an enlarged plan view indicating a condition of liquid crystal layer using black beads wherein light leakage around beads are minimized.

Referring to FIGS. 41–43, problems of light leakage by the beads and countermeasures against them are explained hereinafter.

Figure 20A:
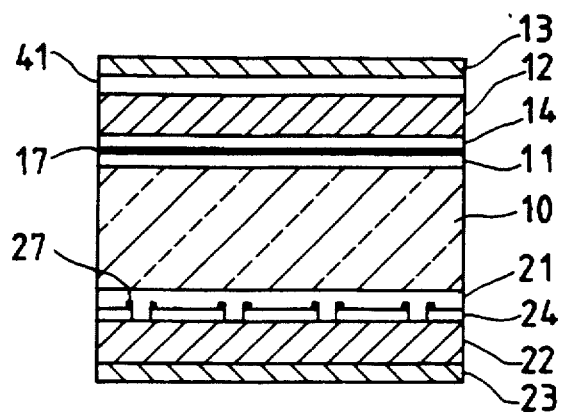
FIGS. 20 illustrate base plates with black matrix used for the liquid crystal display apparatus in the embodiment 3, particularly, FIG. 20(a) indicate a cross section of a liquid crystal display apparatus relating to the present invention except a driving portion, back lights, and reflectors, FIG. 20(b) indicates distribution of light absorbing layers on the base plate in a perpendicular view of bottom of the base plate.
FIG. 20(c) is a plan view of the base plate for indicating distribution of light absorbing layers when two base plates are laminated vertically.
Figure 20B:
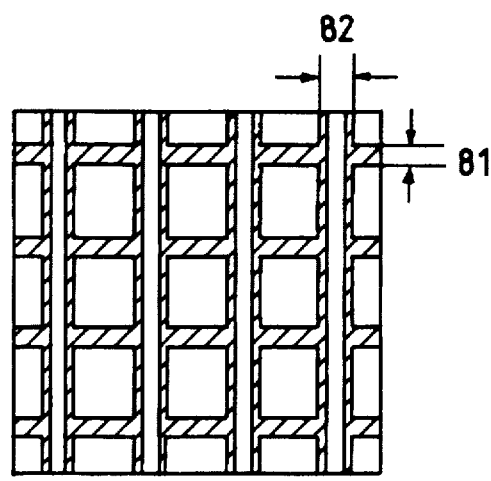
Figure 20C:
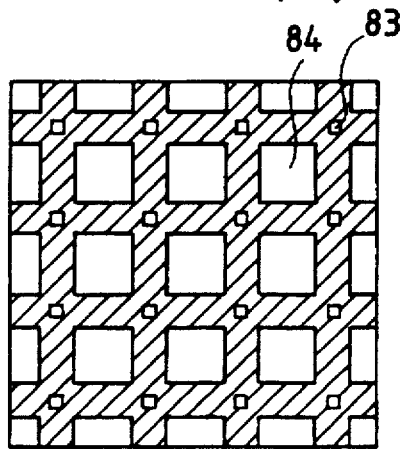

FIG. 41 illustrates an enlarged picture element of a liquid crystal display apparatus shown in FIG. 20(c) which will be explained later, for example, when it is condition displaying in a dark state. In an example shown in FIG. 41, the bead 85 for keeping gaps between the liquid crystals are transparent, and therefore, both the light leakage through the bead itself and the light leakage through the domain 86 around the bead 85 can be observed. A problem of the light leakage through the bead itself can be solved by using black beads 87 as shown in FIG. 42.

In accordance with experimental observation by the inventors of the present application, the domain 86 around the bead has an applied voltage dependency in its diametral size. When an applied voltage is less than a threshold voltage, liquid crystal molecule orientation around the beads is dominantly controlled by the beads. On the contrary, when the applied voltage is higher than the threshold voltage, an electric field control is dominant, and diametral size of the domain 86 around the beads 87 decreases as shown in FIG. 43. Accordingly, if a display in a dark state is operated with a voltage higher than the threshold voltage for decreasing domain size around the beads, a contrast ratio can increase.

Embodiment 1

Figure 8:
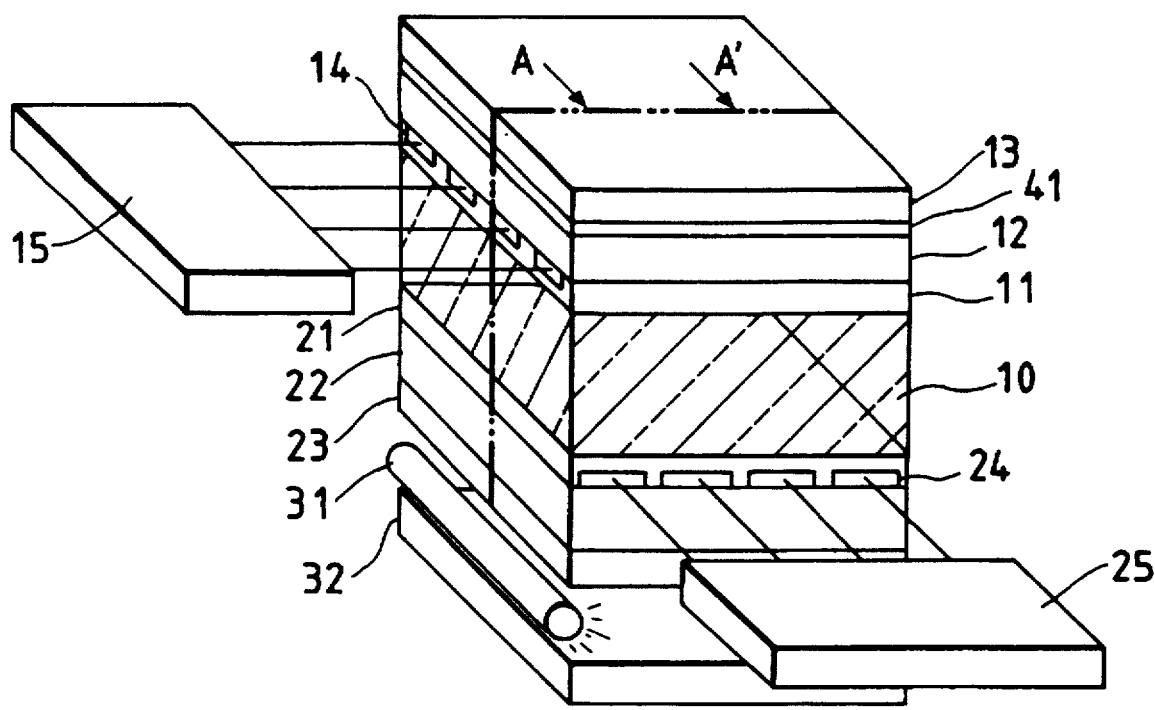
FIG. 8 is a perspective view indicating schematically a composition of a liquid crystal display apparatus in an embodiment of the present invention.

A composition of a liquid crystal display apparatus of the present invention is shown in FIG. 8. In FIG. 8, the numeral 10 is a twisted nematic liquid crystal layer, 11 is a top alignment layer, 21 is a bottom alignment layer, 12 is a top transparent base plate, 22 is a bottom transparent base plate, 13 is a top polarizer, 23 is a bottom polarizer, 14 is a top transparent electrode, 24 is a bottom transparent electrode, 31 is a back light, 32 is a reflector, 15, 25 are driving portions, 41 is birefringent media, respectively.

The liquid crystal layer 10 included black beads (not shown in FIG. 8) so aS to keep thickness of the liquid crystal layer homogeneous. The beads were dispersed so that dispersion density of the bead became about ten beads per one picture element.

Each of the alignment layers 11, 21 was made of polyimide film obtained by calcination of RN422 made by Nissan Chemicals Co., and its film thickness was 1000 Å. Calcining temperature was 180° C., and calcining time was 30 minutes. Rubbing method was so applied to the alignment layers that the liquid crystal layer has a twisted angle of 240° and a pretilt angle of 4°. Each of the transparent electrodes 14, 24 is made from ITO (indium tin oxide), and is 1500 Å thick and 0.32 mm wide. Width of a gap between adjacent two transparent electrodes was 0.03 mm. Cell gap was 6.3 μm, and birefringence of the liquid crystal material at 25° C. was 0.13. The polarizer was G-1220DU made by NITTO DENKO Co.

Figure 9:
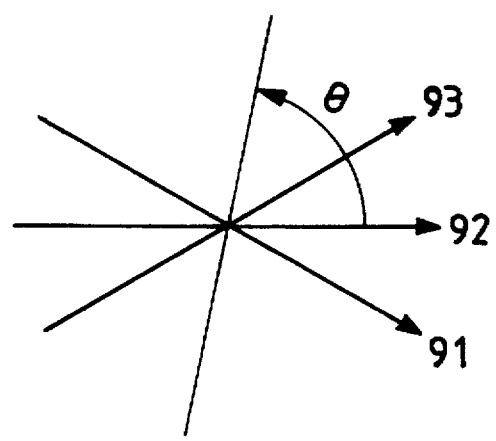
FIG. 9 is a drawing for explaining definition of an angle in the present invention.

Definition of an angle is shown in FIG. 9. The numeral 91 indicates a rubbing vector of the top base plate, 92 is a synthesized direction of the rubbing vector of the top base and the bottom base plate, and 93 is a rubbing vector of the bottom base plate. Taking the synthesized direction of the rubbing vector as zero, the angle is defined as anti-clock wise.

Figure 10:
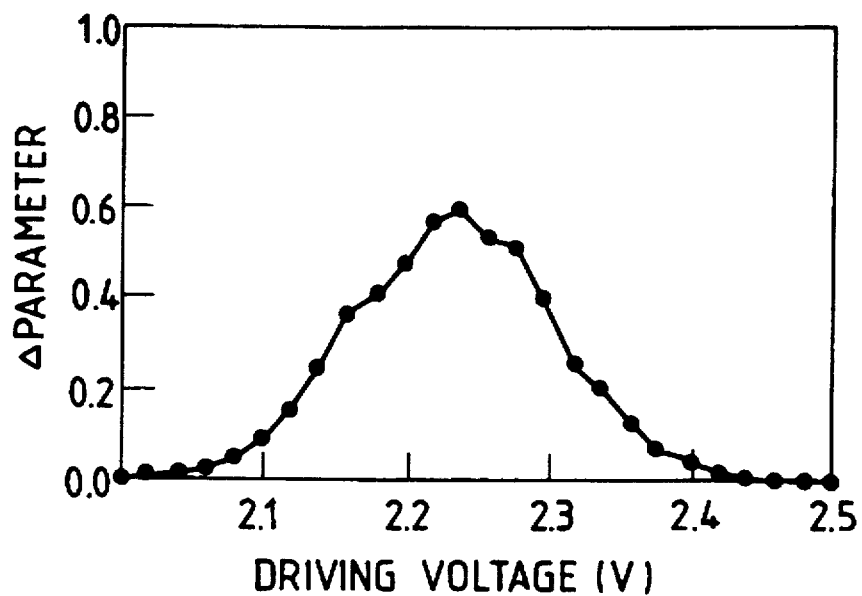
FIG. 10 is a graph indicating driving voltage dependency of Δ parameters of the liquid crystal display apparatus in the embodiment 1.

A transmitting axis of the bottom polarizer 23 was set at 75° (that means an angle formed by the transmitting axis with the rubbing vector of the bottom alignment layer 21 was 45°), and Δ parameter of polarized light transmitted through the top transparent base plate 12 was determined. A result of the measurement on the Δ parameter of the above STN-LCD is shown in FIG. 10. Abscissa of FIG. 10 indicates applied voltage, $V_{OFF}$. Wavelength at the measurement was 550 nm, and a ratio of $V_{ON}/V_{OFF}$ was set as 1.073. Peak of the A parameter exists at $V_{OFF}$ equals 2.22 volts and its value is 0.59.

Figure 11:
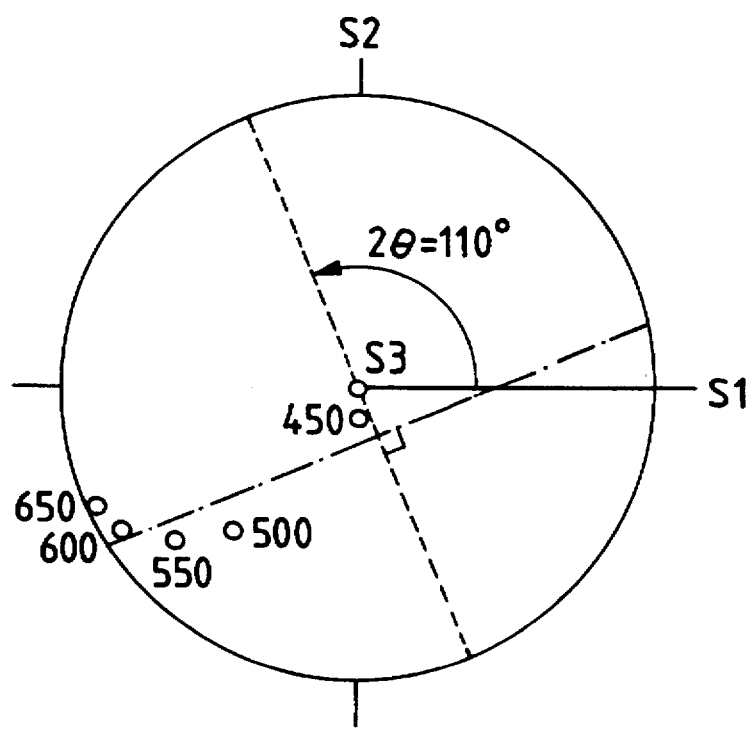
FIG. 11 is a Poincare sphere sighted from a S3 axis direction for indicating a wavelength dependency of polarizing light transmitted through the liquid crystal layer and a slow axis angle of a birefringent media when 2.38 volt is applied to the liquid crystal display apparatus in the embodiment 1.

An equivalent voltage of $V_{ON}$ (2.22×1.073=2.38 V) to $V_{OFF}$ (2.22 V) which gives the peak value of Δ parameter was applied to the above STN-LCD, and normalized Stokes parameters were determined for the transmitted light at respective wavelengths, 450 nm, 500 nm, 550 nm, 600 nm, and 650 nm. Results of the above measurement are shown as plots on a Poincare sphere in FIG. 11. FIG. 11 illustrates a Poincare sphere sighted from a S3 axis direction, whereon the plots are distributed almost linearly. When a regression line which makes a sum of deviations between the respective dots and the regression line minimum was drawn, an angle formed by the regression line and S1 axis was 20°. When a slow axis angle of the birefringent media was obtained from an angle formed by a line which crossed over the regression line perpendicularly and S1 axis, it was 56° by (20°+90°)× 0.5.

Next, a wavelength dependency of the retardation for the phase plate necessary for + primary phase difference compensation was obtained by taking 8 in the equation (1) equals to 55°. The result was as shown by black dots in FIG. 12. The wavelength dependency of birefringence defined by the equation (2) was 1.38.

Figure 12:
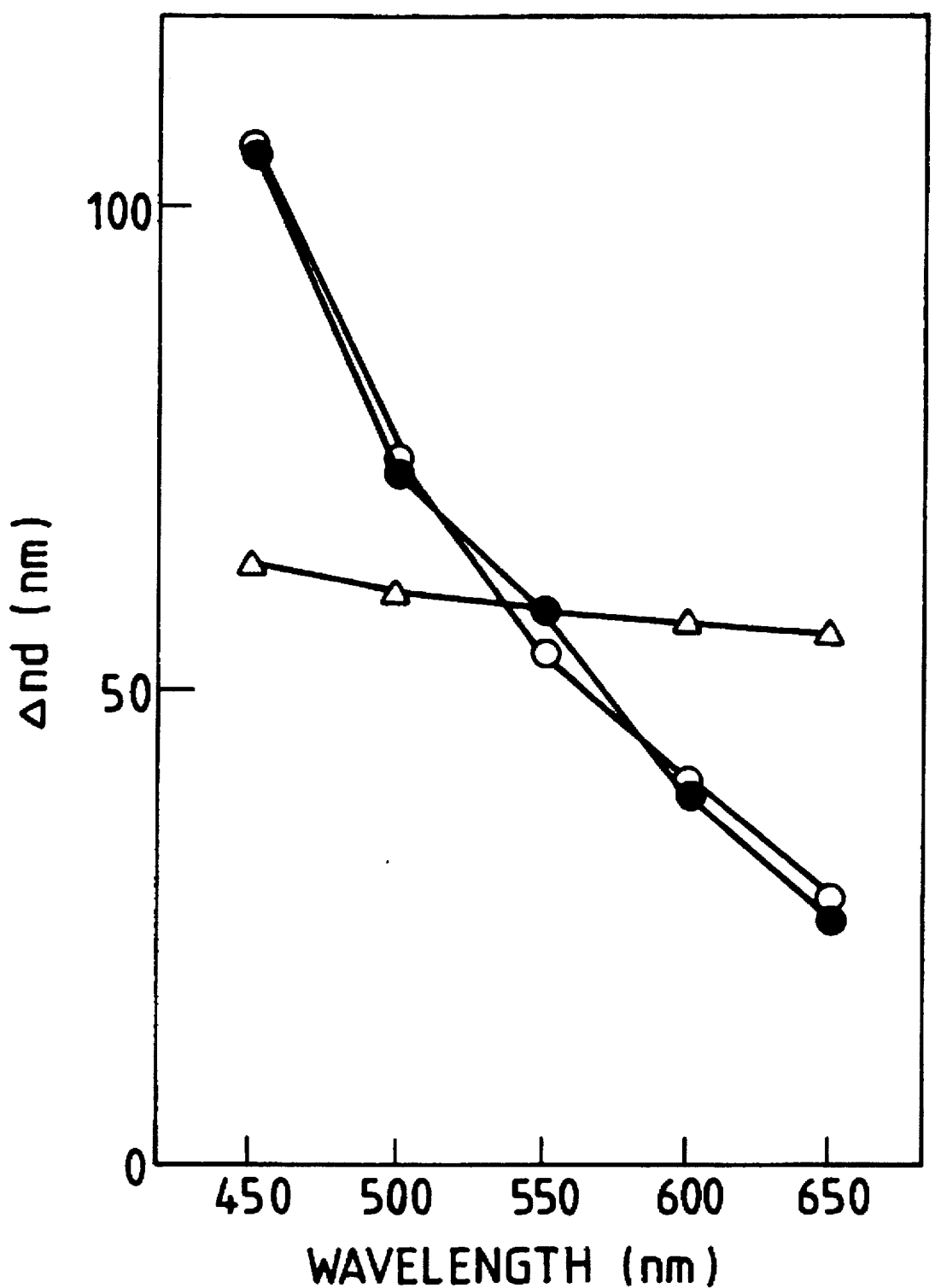
FIG. 12 is a graph indicating wavelength dependency of retardation of birefringent media necessary for performing + primary compensation to the liquid crystal display apparatus in the embodiment 1 and the comparative example 2 (black dot), wavelength dependency of birefringence of birefringent media used in the liquid crystal display apparatus in the embodiment 1 (white dot), and wavelength dependency of birefringence of birefringent media used in the liquid crystal display apparatus in the comparative example 2 (white triangle)

In order to prepare birefringent media having a wavelength dependency of the retardation as shown in FIG. 12, polycarbonate and polyvinyl alcohol were so laminated that their respective slow axis crossed over perpendicularly each other. The retardation at wavelength 550 nm is 810 nm for polycarbonate, and 760 nm for polyvinyl alcohol. The wavelength dependency of retardation of the birefringent media prepared in the manner described above was 1.46. The wavelength dependency of the retardation is shown by white dots in FIG. 12. The black dots and the white dots almost coincided.

Figure 13A:
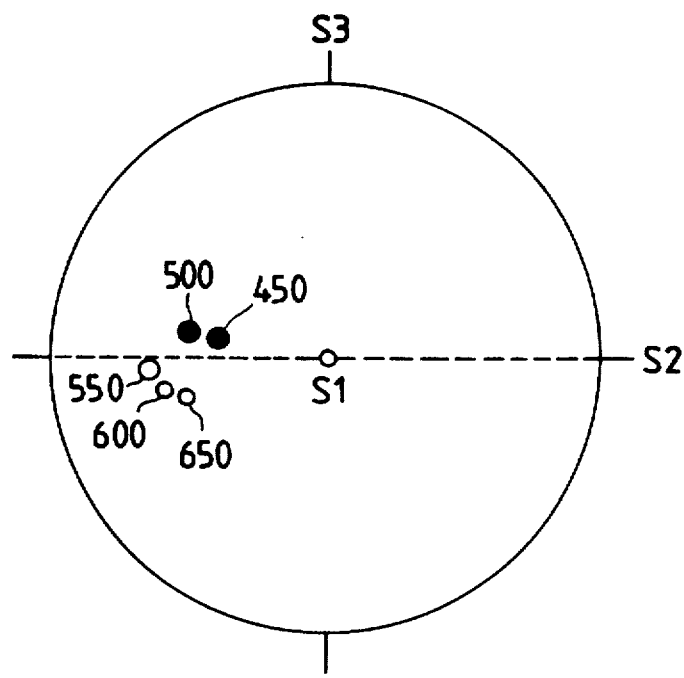
FIGS. 13 are drawings for explaining a wavelength dependency of polarizing light transmitted through the liquid crystal layer applied with 2.38 volt and the birefringent media in the liquid crystal display apparatus in the embodiment 1, FIG. 13 (a) is a Poincare sphere sighted from a S1 axis direction.
FIG. 13(b) is a Poincare sphere sighted from a S3 axis direction, and FIG. 13(b) further indicates an absorbing axis angle of a top polarizer.
Figure 13B:
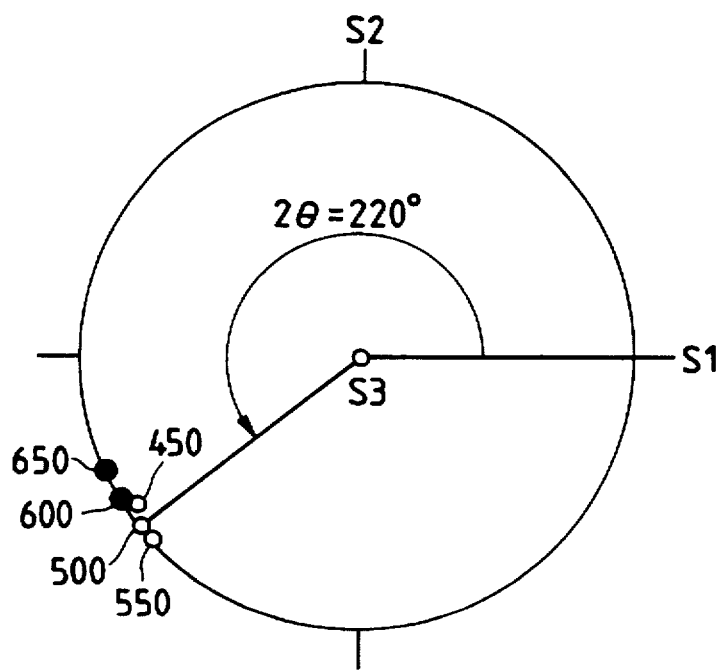

The birefringent media prepared in the manner described above were adhered to the STN-LCD with setting the obtained slow axis angle at 55°. Subsequently, the STN-LCD was applied with a voltage 2.38 V, and polarizing states of the transmitting light were determined. The results were shown in FIG. 13(a) and FIG. 13(b). FIG. 13(a) illustrates a Poincare sphere sighted from a S1 axis direction, wherein an equator expressing a linear polarization is projected on the S2 axis (the dotted line in FIG. 13(a)). The result reveals that the obtained values at respective wavelength are located near the equator. FIG. 13(b) is a Poincare sphere sighted from a S3 axis direction, and it reveals that the values obtained at respective wavelength are located near a point of 220° anticlock wise from the S1 axis. That means, each of the points of respective wavelength projects linear polarizing light having a vibration direction of 110° from the birefringent media. Accordingly, transmitting light in a dark state can be decreased mostly by adhering the top polarizer 13 in a manner that its absorbing axis becomes 110°.

Figure 14:
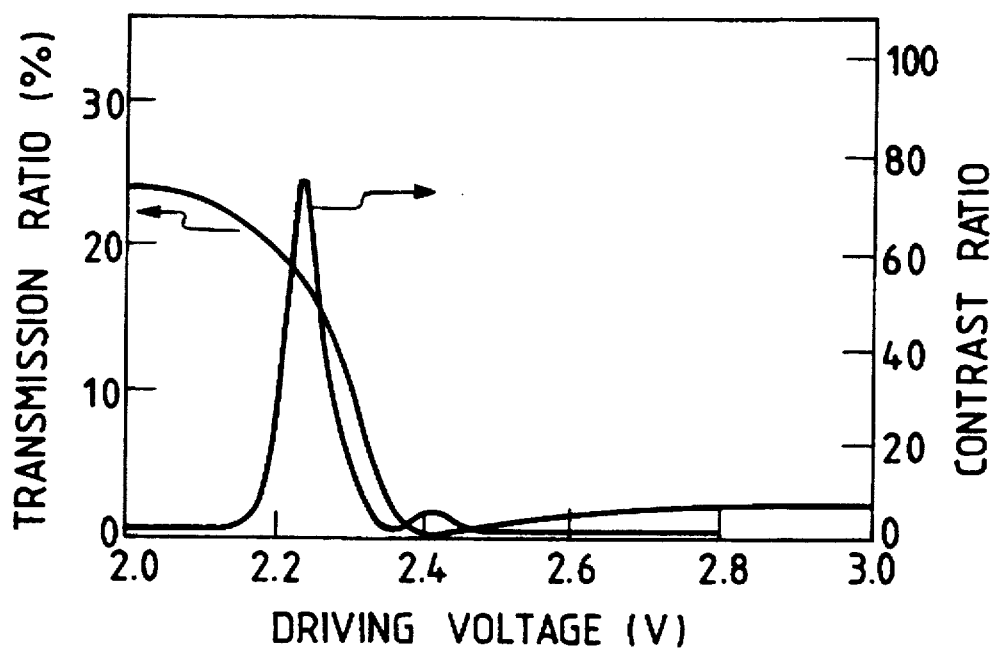
FIG. 14 is a graph indicating applied voltage dependency of transmission ratio and contrast ratio of the liquid crystal display apparatus in the embodiment 1.

A B-V characteristics of the phase plate type STN-LCD prepared in a manner described above was determined. Area of the determination was restricted to a portion of a picture element wherein the beads did not exist. The result is shown in FIG. 14. The abscissa in FIG. 14 expresses $V_{OFF}$ regarding to the contrast ratio. The maximum contrast ratio, 76:1, was obtained at the driving voltage, $V_{OFF}$, of 2.22 V.

As explained above, an improved contrast ratio superior significantly to that of the conventional phase plate type STN-LCD could be realized by selecting an applied voltage, with which transmitting lights through the liquid crystal layer distribute almost linearly on a Poincare sphere sighted from a S3 axis direction, obtaining a necessary wavelength dependency of retardation for birefringent media at the above voltage from polarizing condition of transmitting light having respective wavelength measured by a polarizing light analytical method, laminating a plurality of phase plates having different wavelength dependency of birefringence so that their respective slow axis cross over perpendicularly each other, and determining the slow axis of the birefringent media and the absorbing axis of the top polarizer on a Poincare sphere.

A B-V characteristics of the above phase plate type STN-LCD including non electrode portions was determined on a measuring region of ten picture elements. The maximum contrast ratio was 5.5:1.

Embodiment 2

Figure 15:
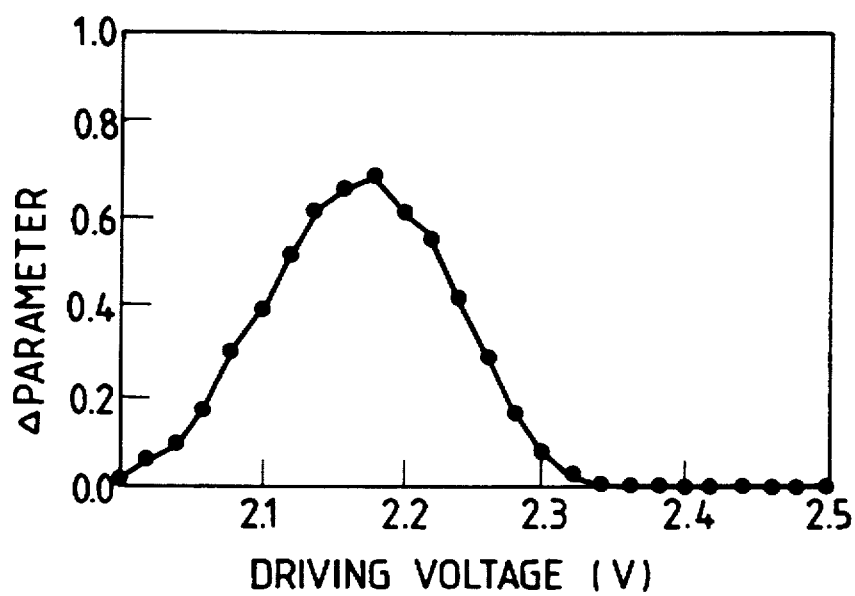
FIG. 15 is a graph indicating applied voltage dependency of Δ parameters of the liquid crystal display apparatus in the embodiment 2.

With a liquid crystal display apparatus composed in the same manner as the apparatus in the embodiment 1, the twisted angle was changed to 260°. A transmitting axis of the bottom polarizer 23 was set as 85° (that is, an angle formed with rubbing vector of the bottom alignment layer was 45°), and Δ parameters of polarized light transmitted through the top transparent base plate 14 were determined. FIG. 15 indicates the result of the determination. Wavelength at the determination was 550 nm, and $V_{ON}/V_{OFF}$ was selected as 1.073. The peak of the Δ parameters is obtained as 0.68 at a driving voltage ($V_{OFF}$) of 2.18 V.

Figure 16:
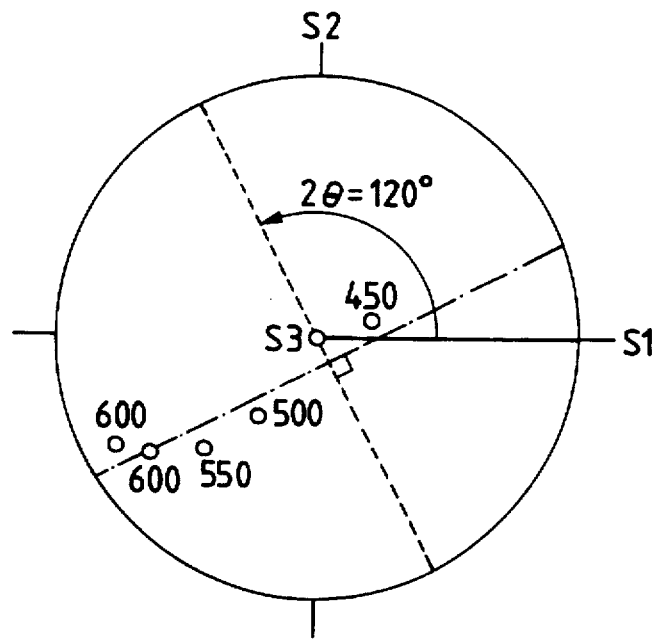
FIG. 16 is a Poincare sphere sighted from a S3 axis direction for indicating a wavelength dependency of polarizing light transmitted through the liquid crystal layer and a slow axis angle of a birefringent media when 2.34 volt is applied to the liquid crystal display apparatus in the embodiment 2.

A voltage $V_{ON}$ (2.18×1.073=2.34 V) equivalent to the $V_{OFF}$ (2.18 V) which gave the peak value of Δ parameters was applied to the STN-LCD, and normalized Stokes parameters of transmitted light were measured with wavelength 450 nm, 500 nm, 550 nm, 600 nm, 650 nm, respectively. The result of the measurement is plotted on a Poincare sphere shown in FIG. 16. FIG. 16 illustrates a Poincare sphere sighted from a S3 axis direction, and each of the dots is distributed almost linearly. When a regression line which makes a sum of deviations between the respective dots and the regression line minimum was drawn, an angle formed by the regression line and S1 axis was 30°. When a slow axis angle of the birefringent media 41 was obtained from an angle formed by a line which crossed over the regression line perpendicularly and S1 axis, it was 60° by (30°+90°)× 0.5.

Next, a wavelength dependency of the retardation for the phase plate necessary for + primary phase difference compensation was obtained by taking θ in the equation (1) equals to 60°. The result was as shown by black dots in FIG. 17. The wavelength dependency of birefringence defined by the equation (2) was 0.72.

Figure 17:
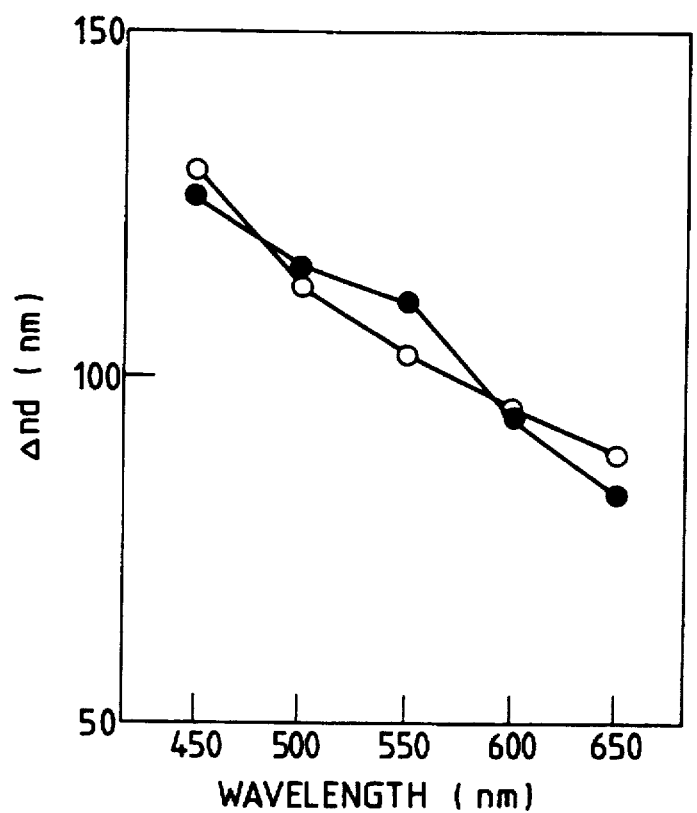
FIG. 17 is a graph indicating wavelength dependency of retardation of birefringent media necessary for performing + primary compensation to the liquid crystal display apparatus in the embodiment 2 and the comparative example 1 (black dot), wavelength dependency of birefringence of birefringent media used in the liquid crystal display apparatus in the embodiment 2 (white dot)

In order to prepare birefringent media 41 having a wavelength dependency of the retardation as shown in FIG. 17, polycarbonate and polyvinyl alcohol were so laminated that their respective slow axis crossed over perpendicularly each other. The retardation at wavelength 550 nm is 410 nm for polycarbonate, and 310 nm for polyvinyl alcohol. The wavelength dependency of birefringence of the birefringent media prepared in the manner described above was 0.40. The wavelength dependency of the retardation is shown by white dots in FIG. 12. The black dots and the white dots almost coincided.

Figure 18A:
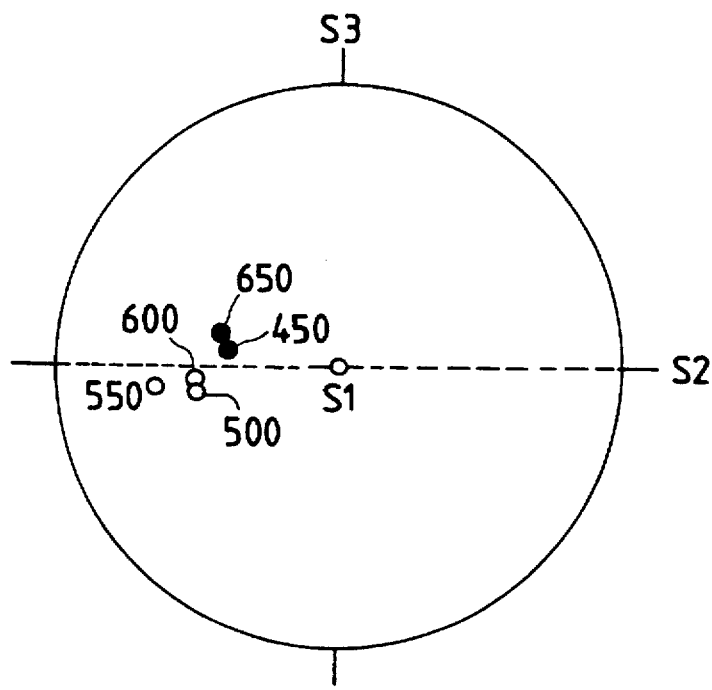
FIG. 18(a) is a Poincare sphere sighted from a S1 axis direction.
Figure 18B:
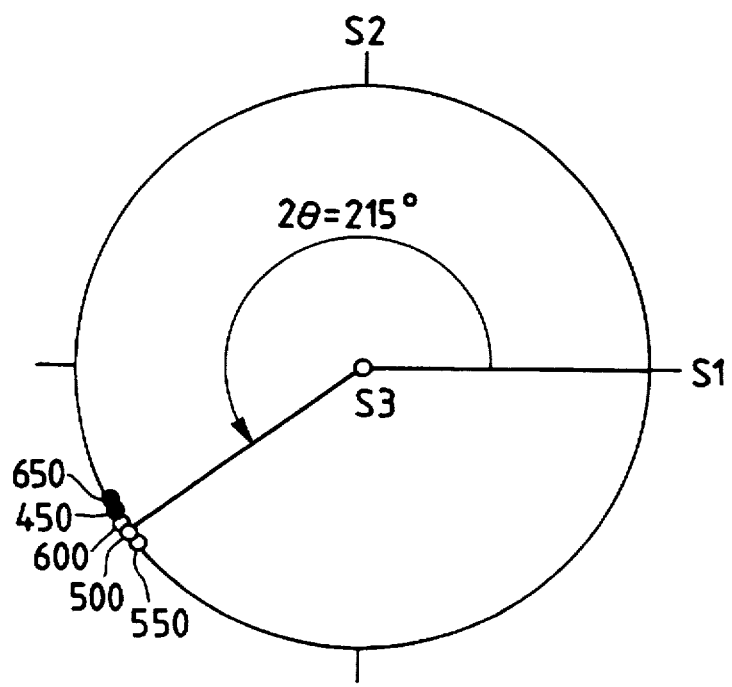
FIG. 18(b) is a Poincare sphere sighted from a S3 axis direction.

The birefringent media prepared in the manner described above were adhered to the STN-LCD with setting the obtained slow axis angle at 60°. Subsequently, the STN-LCD was applied with a voltage 2.34 V, and polarizing conditions of the transmitting light were determined. The results were shown in FIG. 18(a) and FIG. 18(b). FIG. 18(a) illustrates a Poincare sphere sighted from a S1 axis direction, wherein an equator expressing a linear polarization is projected on the S2 axis (the dotted line in FIG. 18(a)). The result reveals that the obtained values at respective wavelength are located near the equator. FIG. 18(b) is a Poincare sphere sighted from a S3 axis direction, and it reveals that the values obtained at respective wavelength are located near a point of 215° anticlock wise from the S1 axis. That means, each of the points of respective wavelength projects linear polarizing light having a vibration direction of 108° (215°/2≈108°) from the birefringent media. Accordingly, transmitting light in a dark state can be decreased mostly by adhering the top polarizer 13 in a manner that its absorbing axis becomes 108°.

Figure 19:
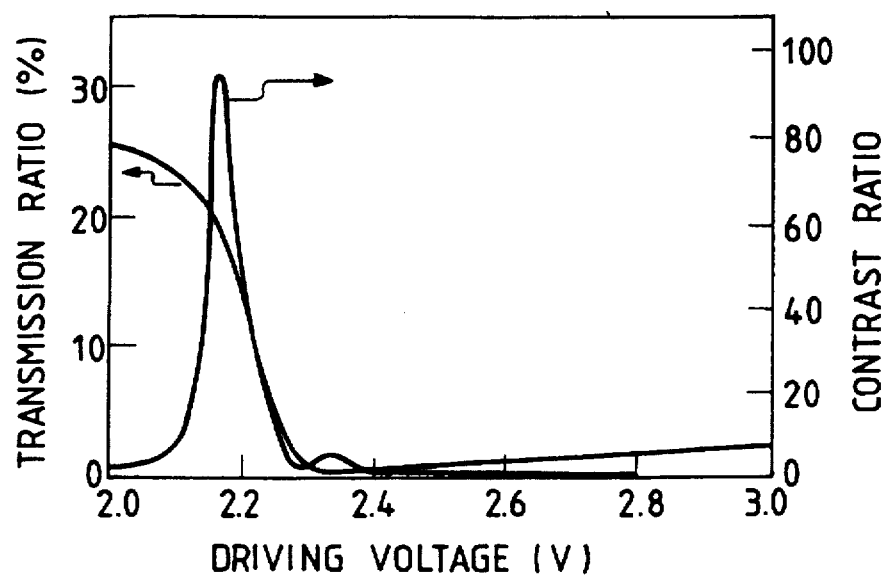
FIG. 19 is a graph indicating applied voltage dependency of transmission ratio and contrast ratio of the liquid crystal display apparatus in the embodiment 2.

A B-V characteristics of the phase plate type STN-LCD prepared in a manner described above was determined. Area of the determination was restricted to a portion of a picture element wherein the beads did not exist. The result is shown in FIG. 19. The maximum contrast ratio, 81:1, was obtained at the driving voltage, $V_{OFF}$, of 2.18 V.

As explained above, an improved contrast ratio superior significantly to that of the conventional phase plate type STN-LCD could be realized even at the twisted angle 108° by selecting an applied voltage, with which transmitting lights through the liquid crystal layer distribute almost linearly on a Poincare sphere sighted from a S3 axis direction, obtaining a necessary wavelength dependency of retardation for birefringent media at the above voltage from polarizing condition of transmitting light having respective wavelength measured by a polarizing light analytical method, laminating a plurality of phase plates having different wavelength dependency of birefringence so that their respective slow axis cross over perpendicularly each other, and determining the slow axis of the birefringent media and the absorbing axis of the top polarizer on a Poincare sphere.

A B-V characteristics of the above phase plate type STN-LCD including non electrode portions was determined on a measuring region of ten picture elements. The maximum contrast ratio was 5.6:1.

Embodiment 3

A base plate attached with a black matrix was used for a liquid crystal display apparatus similar to the apparatus in the embodiment 1 except changing the beads to transparent ones. A cross section of the base plate is shown in FIG. 20(a). In FIG. 20(a), the numeral 17 indicates a light absorber layer at an upper base plate, and the numeral 27 indicates an absorber layer at a lower base plate. FIG. 20(b) is a plan view of the base plate attached with the black matrix sighted from a perpendicular direction to the base plate indicating a distribution of the absorber layers 17 and 27. The light absorber layers 17 and 27 are distributed in a ladder shape, and the width 81 of a step is substantially equal to a gap between the transparent electrodes 82. FIG. 20(c) indicates is a plan view of a displaying portion of the liquid crystal display apparatus using the upper and the lower base plates attached with the black matrix sighted from a perpendicular direction to the base plate plane. Non electrode portion is completely covered with the light absorber layer except four corners 83, and the square electrode portions 84 are remained.

A B-V characteristics of the above phase plate type STN-LCD including non electrode portions was determined on a measuring region of ten picture elements. The maximum contrast ratio was 40:1.

As explained above, the maximum contrast ratio including the non electrode portion could be increased more than that of the conventional phase plate type STN-LCD by using the base plates attached with the black matrix, even though the maximum contrast ratio did not reach to that of the picture element portion.

Embodiment 4

The base plate attached with the black matrix used in the embodiment 3 was applied to the liquid crystal display apparatus used in the embodiment 2.

A B-V characteristics of the above phase plate type STN-LCD including non electrode portions was determined on a measuring region of ten picture elements. The maximum contrast ratio was 45:1.

As explained above, the maximum contrast ratio including the non electrode portion could be increased more than that of the conventional phase plate type STN-LCD by using the base plates attached with the black matrix, even though the maximum contrast ratio did not reach to that of the picture element portion.

Embodiment 5

Figure 21:
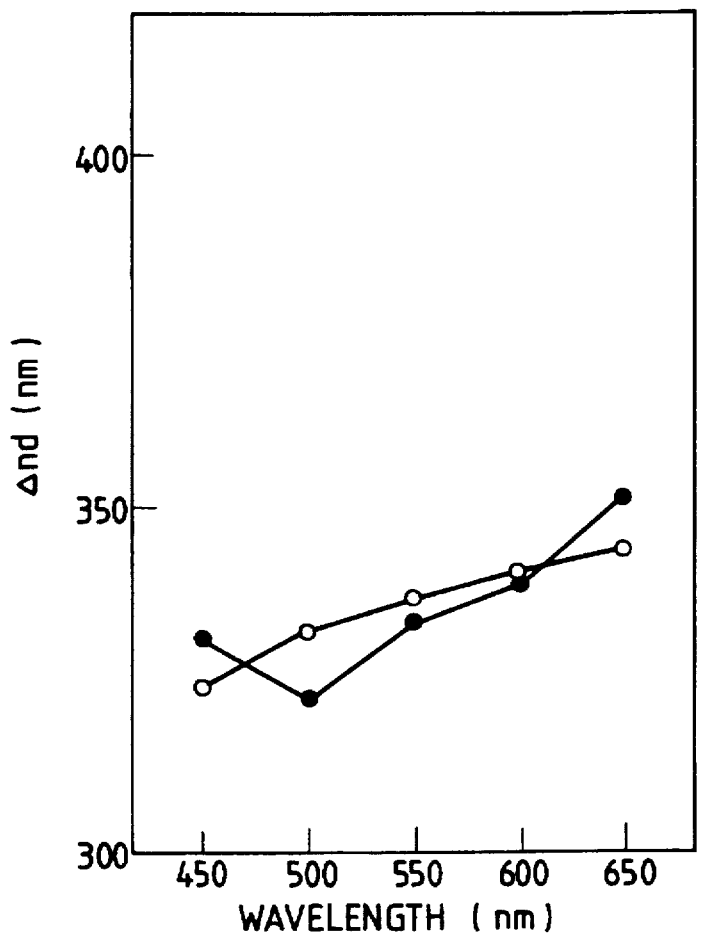
FIG. 21 is a graph indicating wavelength dependency of birefringent media necessary for performing + secondary compensation to the liquid crystal display apparatus in the embodiment 5 (black dot), and wavelength dependency of birefringent media used in the liquid crystal display apparatus in the embodiment 6 (white dot)

To the liquid crystal display apparatus used in the embodiment 1, + secondary compensation was applied. Wavelength dependency of retardation of birefringent media necessary for the + secondary compensation was a reverse dependency as shown by black dots in FIG. 21, and the wavelength dependency of birefringence defined by the equation (2) was −0.06. In order to prepare birefringent media having a wavelength dependency of the retardation as shown in FIG. 21, polycarbonate and polyvinyl alcohol were so laminated that their respective slow axis crossed over perpendicularly each other. The retardation at wavelength 550 nm was 280 nm for polycarbonate, and 620 nm for polyvinyl alcohol. The wavelength dependency of birefringence of the birefringent media prepared in the manner described above was −0.06. The wavelength dependency of the retardation is shown by white dots in FIG. 21. The black dots and the white dots almost coincided.

The birefringent media prepared in the manner described above were adhered to the above STN-LCD with setting the obtained slow axis angle at 56°. Subsequently, the STN-LCD was applied with a voltage 2.38 V, and polarizing conditions of the transmitting light were determined. The results revealed that points for respective wavelength were concentrated to a point 15° rotated anti clock wise from S1 axis. An upper polarizer was adhered to the STN-LCD so that its absorbing axis became 8°, and B-V characteristics was measured in a picture element wherein the beads did not exist. The obtained maximum contrast ratio was 62:1.

As explained above, the contrast ratio superior significantly to that of the conventional phase plate type STN-LCD could be realized by + secondary compensation.

Embodiment 6

The base plate attached with the black matrix used in the embodiment 3 was applied to the liquid crystal display apparatus used in the embodiment 5.

A B-V characteristics of the above phase plate type STN-LCD including non electrode portions was determined on a measuring region of ten picture elements. The maximum contrast ratio was 39:1.

As explained above, the maximum contrast ratio including the non electrode portion could be increased more than that of the conventional phase plate type STN-LCD by using the base plates attached with the black matrix.

Embodiment 7

Figure 22:
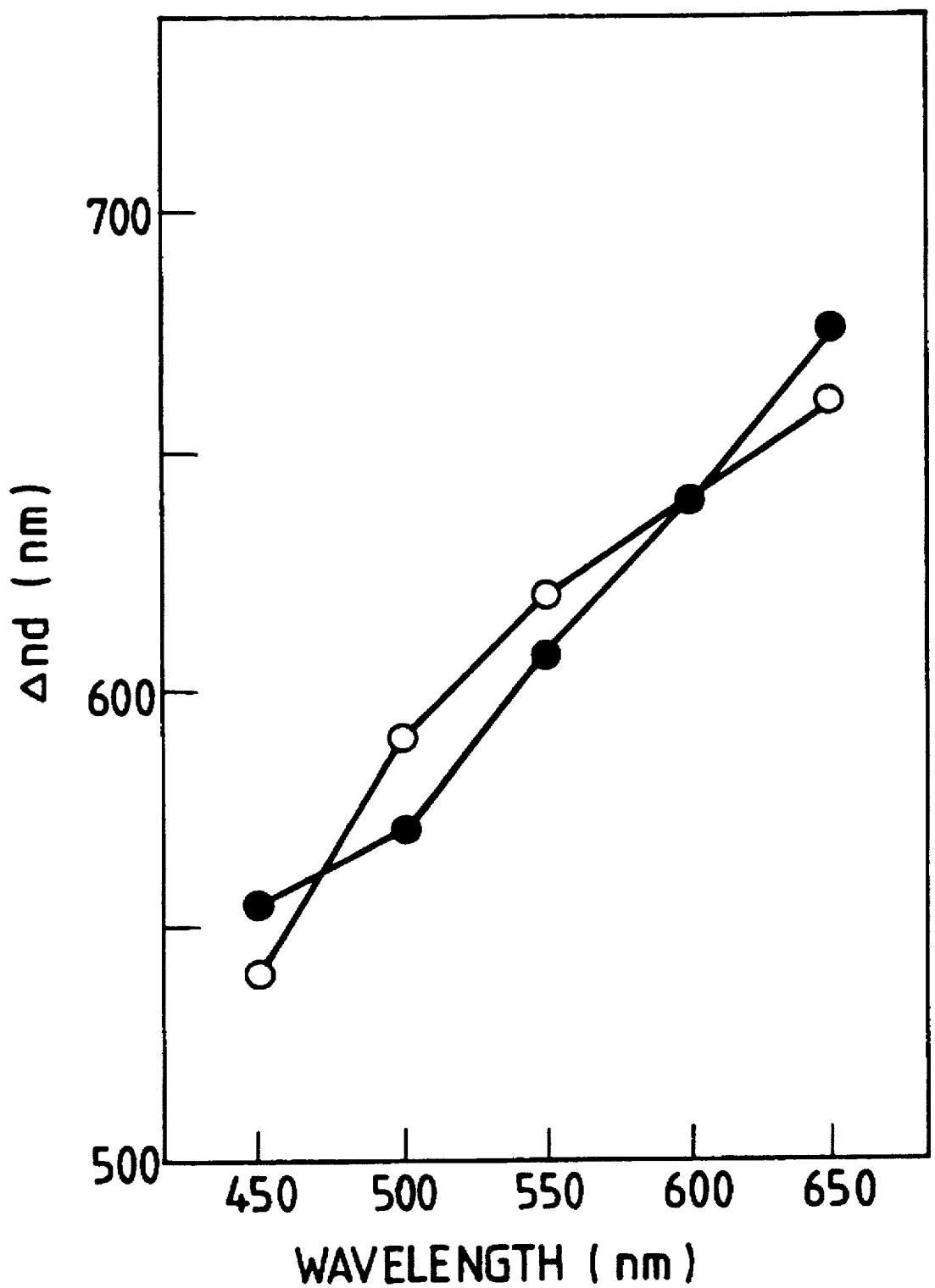
FIG. 22 is a graph indicating wavelength dependency of birefringent media necessary for performing + tertiary compensation to the liquid crystal display apparatus in the embodiment 7 (black dot), and wavelength dependency of birefringence of birefringent media used in the liquid crystal display apparatus in the embodiment 7 (white dot)

To the liquid crystal display apparatus used in the embodiment 1, + tertiary compensation was applied. Wavelength dependency of retardation of birefringent media necessary for the + tertiary compensation was a reverse dependency as shown by black dots in FIG. 22, and the wavelength dependency of birefringence defined by the equation (2) was −0.20. In order to prepare birefringent media having a wavelength dependency of the retardation as shown in FIG. 22, polycarbonate and polyvinyl alcohol were so laminated that their respective slow axis crossed over perpendicularly each other. The retardation at wavelength 550 nm was 1390 nm for polycarbonate, and 2010 nm for polyvinyl alcohol. The wavelength dependency of birefringence of the birefringent media prepared in the manner described above was −0.19. The wavelength dependency of the retardation is shown by white dots in FIG. 22. The black dots and the white dots almost coincided.

The birefringent media prepared in the manner described above were adhered to the above STN-LCD with setting the obtained slow axis angle at 55°. Subsequently, the STN-LCD was applied with a voltage 2.38 V, and polarizing conditions of the transmitting light were determined. The results revealed that points for respective wavelength were concentrated to a point 214° rotated anti clock wise from S1 axis. An upper polarizer was adhered to the STN-LCD so that its absorbing axis became 107°, and B-V characteristics was measured in a picture element wherein the beads did not exist. The obtained maximum contrast ratio was 60:1.

As explained above, the contrast ratio superior significantly to that of the conventional phase plate type STN-LCD could be realized by + tertiary compensation.

Embodiment 8

Figure 23:
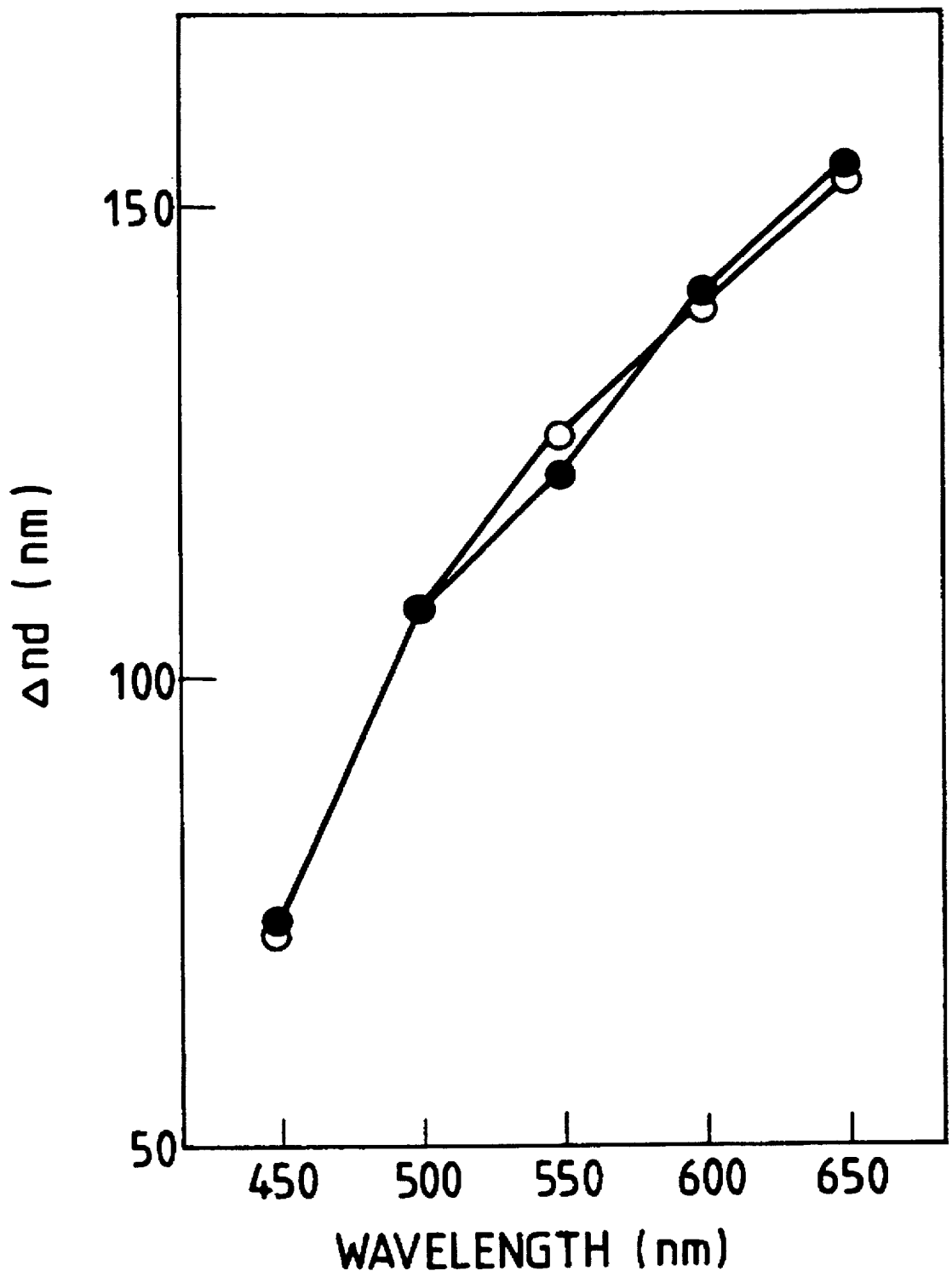
FIG. 23 is a graph indicating wavelength dependency of birefringent media necessary for performing + primary compensation to the liquid crystal display apparatus in the embodiment 8 (black dot), and wavelength dependency of birefringence of birefringent media used in the liquid crystal display apparatus in the embodiment 8 (white dot)

To the liquid crystal display apparatus used in the embodiment 1, − primary compensation was applied. Wavelength dependency of retardation of birefringent media necessary for the − primary compensation was a reverse dependency as shown by black dots in FIG. 23, and the wavelength dependency of birefringence defined by the equation (2) was −0.65. In order to prepare birefringent media having a wavelength dependency of the retardation as shown in FIG. 23, polycarbonate and polyvinyl alcohol were so laminated that their respective slow axis crossed over perpendicularly each other. The retardation at wavelength 550 nm was 860 nm for polycarbonate, and 980 nm for polyvinyl alcohol. The wavelength dependency of birefringence of the birefringent media prepared in the manner described above was −0.63. The wavelength dependency of the retardation is shown by white dots in FIG. 23. The black dots and the white dots almost coincided.

The birefringent media prepared in the manner described above were adhered to the above STN-LCD with setting the obtained slow axis angle at 146°. Subsequently, the STN-LCD was applied with a voltage 2.38 V, and polarizing conditions of the transmitting light were determined. The results revealed that points for respective wavelength were concentrated to a point 20° rotated anti clock wise from S1 axis. An upper polarizer was adhered to the STN-LCD so that its absorbing axis became 10°, and B-V characteristics was measured in a picture element wherein the beads did not exist. The obtained maximum contrast ratio was 66:1.

As explained above, the contrast ratio superior significantly to that of the conventional phase plate type STN-LCD could be realized by – primary compensation.

Embodiment 9

Figure 24:
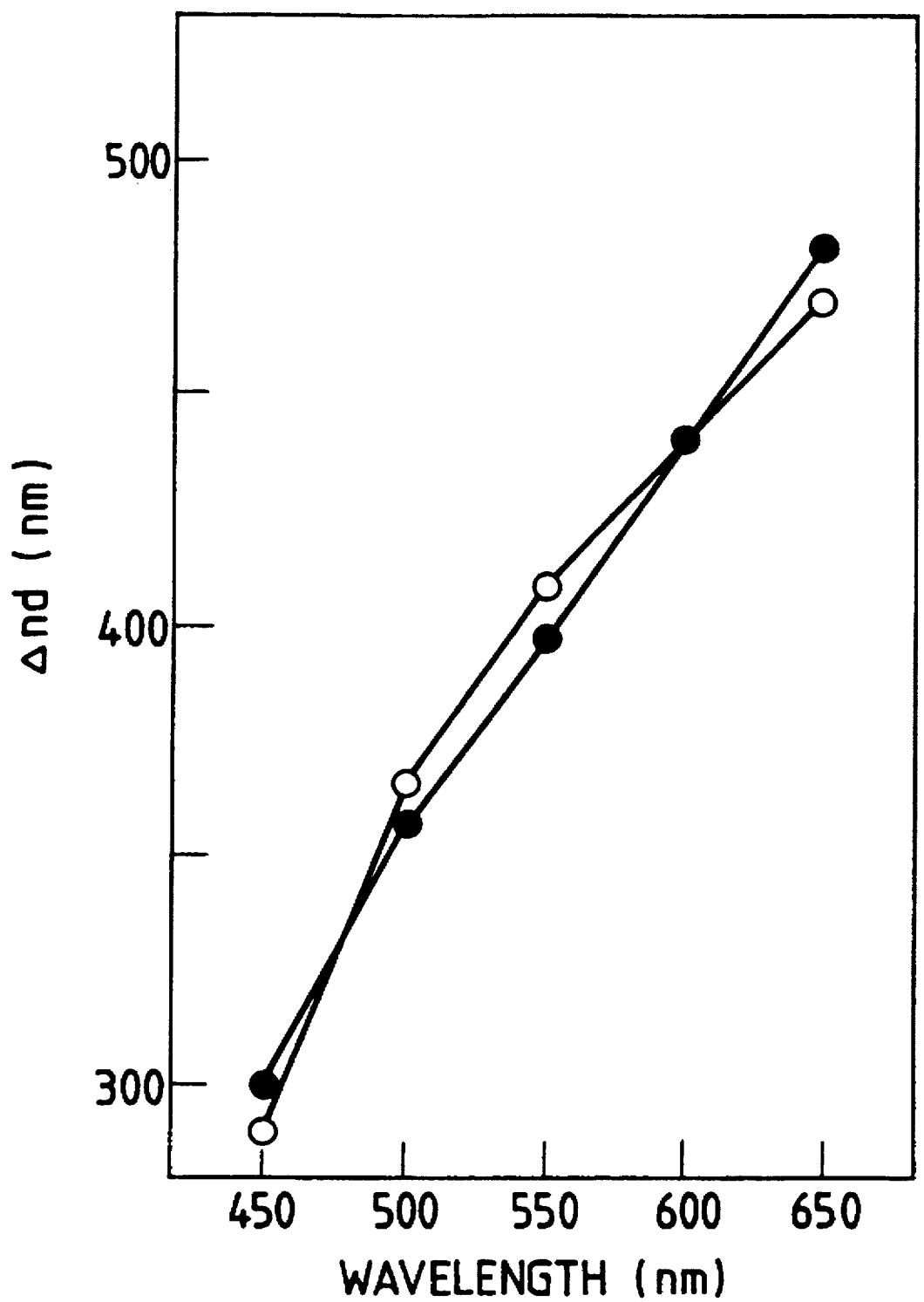
FIG. 24 is a graph indicating wavelength dependency of birefringent media necessary for performing − secondary compensation to the liquid crystal display apparatus in the embodiment 9 (black dot), and wavelength dependency of birefringence of birefringent media used in the liquid crystal display apparatus in the embodiment 9 (white dot)

To the liquid crystal display apparatus used in the embodiment 1, – secondary compensation was applied. Wavelength dependency of retardation of birefringent media necessary for the – secondary compensation was a reverse dependency as shown by black dots in FIG. 24, and the wavelength dependency of birefringence defined by the equation (2) was –0.45. In order to prepare birefringent media having a wavelength dependency of the retardation as shown in FIG. 24, polycarbonate and polyvinyl alcohol were so laminated that their respective slow axis crossed over perpendicularly each other. The retardation at wavelength 550 nm was 1950 nm for polycarbonate, and 2360 nm for polyvinyl alcohol. The wavelength dependency of retardation of the birefringent media prepared in the manner described above was –0.44. The wavelength dependency of the retardation is shown by white dots in FIG. 24. The black dots and the white dots almost coincided.

The birefringent media prepared in the manner described above were adhered to the above STN-LCD with setting the obtained slow axis angle at 146°. Subsequently, the STN-LCD was applied with a voltage 2.38 V, and polarizing conditions of the transmitting light were determined. The results revealed that points for respective wavelength were concentrated to a point 218° rotated anti clock wise from S1 axis. An upper polarizer was adhered to the STN-LCD so that its absorbing axis became 109°, and B-V characteristics was measured in a picture element wherein the beads did not exist. The obtained maximum contrast ratio was 53:1.

As explained above, the contrast ratio superior significantly to that of the conventional phase plate type STN-LCD could be realized by – secondary compensation.

Embodiment 10

Figure 25:
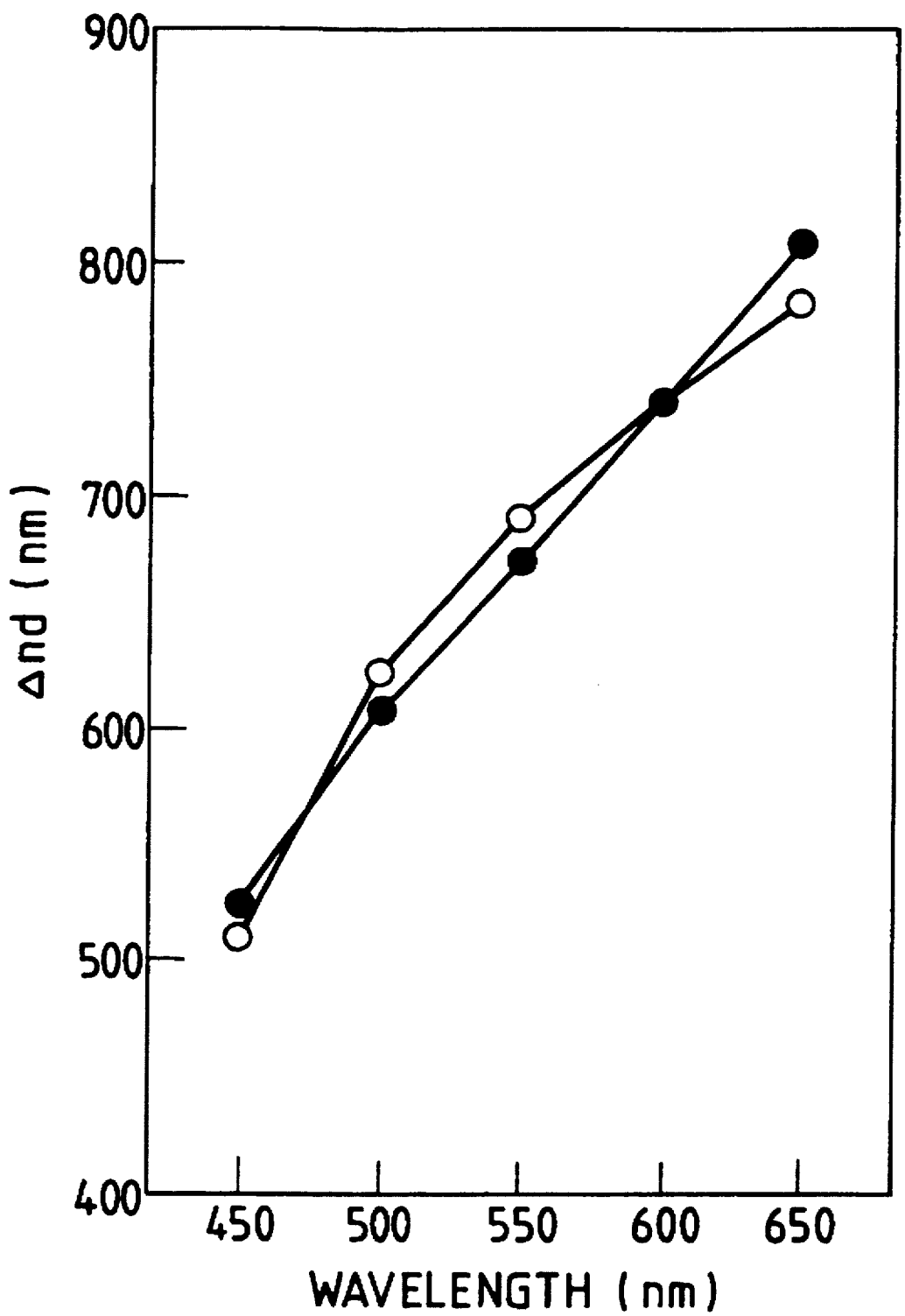
FIG. 25 is a graph indicating wavelength dependency of birefringent media necessary for performing − tertiary compensation to the liquid crystal display apparatus in the embodiment 10 (black dot), and wavelength dependency of birefringence of birefringent media used in the liquid crystal display apparatus in the embodiment 10 (white dot)

To the liquid crystal display apparatus used in the embodiment 1, – tertiary compensation was applied. Wavelength dependency of retardation of birefringent media necessary for the – tertiary compensation was a reverse dependency as shown by black dots in FIG. 25, and the wavelength dependency of birefringence defined by the equation (2) was –0.42. In order to prepare birefringent media having a wavelength dependency of the retardation as shown in FIG. 25, polycarbonate and polyvinyl alcohol were so laminated that their respective slow axis crossed over perpendicularly each other. The retardation at wavelength 550 nm was 3040 nm for polycarbonate, and 3730 nm for polyvinyl alcohol. The wavelength dependency of birefringence of the birefringent media prepared in the manner described above was –0.40. The wavelength dependency of the retardation is shown by white dots in FIG. 25. The black dots and the white dots almost coincided.

The birefringent media prepared in the manner described above were adhered to the above STN-LCD with setting the obtained slow axis angle at 146°. Subsequently, the STN-LCD was applied with a voltage 2.38 V, and polarizing conditions of the transmitting light were determined. The results revealed that points for respective wavelength were concentrated to a point 10° rotated anti clock wise from S1 axis. An upper polarizer was adhered to the STN-LCD so that its absorbing axis became 5°, and B-V characteristics was measured in a picture element wherein the beads did not exist. The obtained maximum contrast ratio was 59:1.

As explained above, the contrast ratio superior significantly to that of the conventional phase plate type STN-LCD could be realized by – tertiary compensation.

Embodiment 11

Figure 26:
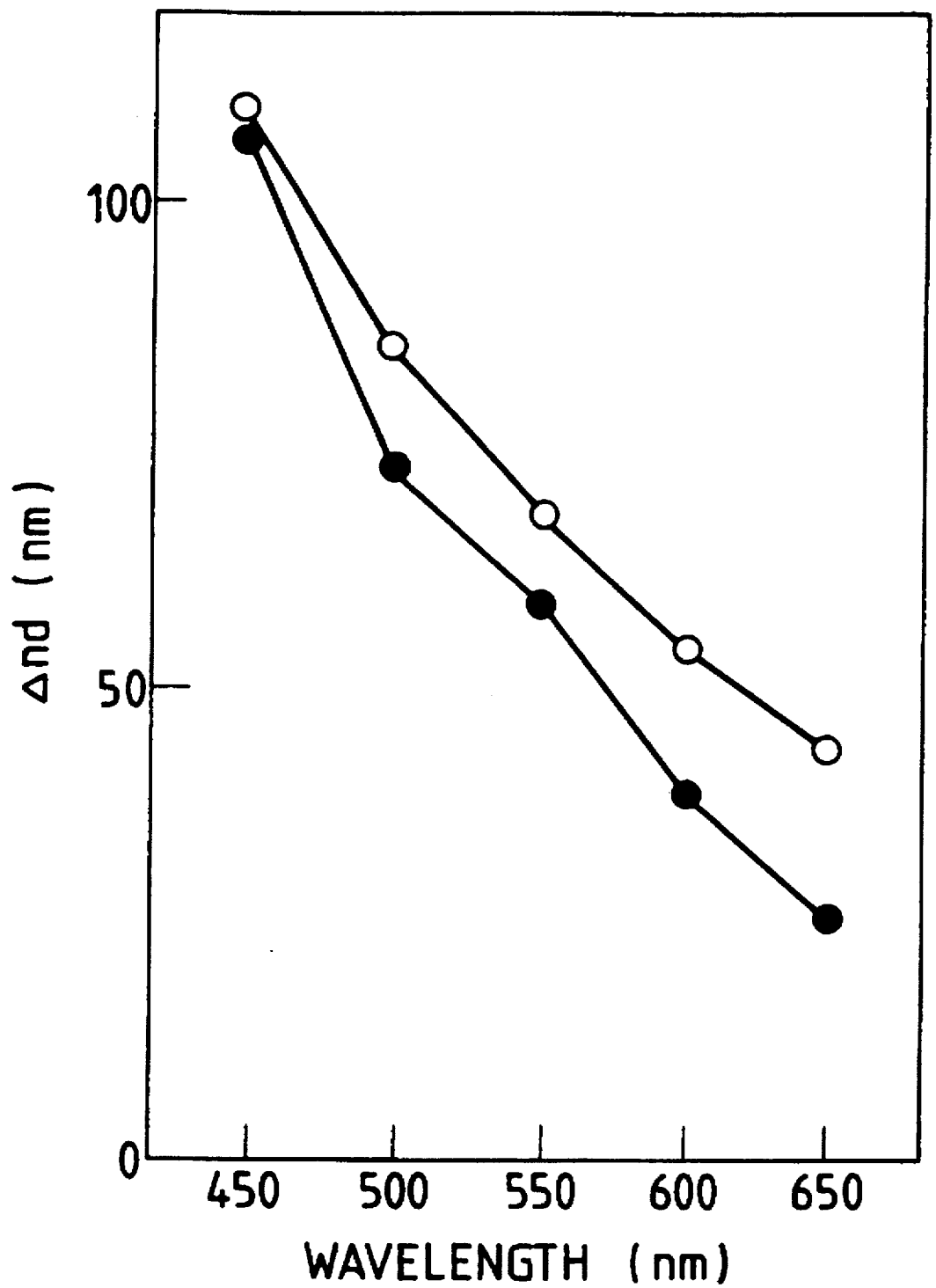
FIG. 26 is a graph indicating wavelength dependency of birefringent media necessary for performing + primary compensation to the liquid crystal display apparatus in the embodiment 12 (black dot), and wavelength dependency of birefringence of birefringent media used in the liquid crystal display apparatus in the embodiment 12 (white dot)

In the liquid crystal display apparatus used in the embodiment 1, the phase plates for the birefringent media were changed to another ones. The retardation at wavelength 550 nm of the new phase plate was 660 nm for polycarbonate, and 600 nm for polyvinyl alcohol. The wavelength dependency of birefringence of the birefringent media prepared as above described was 0.92. The wavelength dependency of the retardation is shown by white dots in FIG. 26. The coincidence of the black dots with the white dots is inferior a little to that of the embodiment 1.

The birefringent media were adhered to the above STN-LCD with setting the obtained slow axis angle at 56°, the upper polarizer was adhered with setting the absorbing axis at 10°, and B-V characteristics was measured in a picture element wherein the beads did not exist. The obtained maximum contrast ratio was 50:1.

As explained above, the contrast ratio superior significantly to that of the conventional phase plate type STN-LCD could be realized by using the phase plate having almost same retardation as the conventional phase plate.

Embodiment 12

The liquid crystal display apparatus used in the embodiment 12 was composed as same as that of the embodiment 3 except changing the beads with black beads. Dispersion density of the black beads was 10 beads per one picture element. Measurement of B-V characteristics of the phase plate type STN-LCD in the present embodiment revealed that the maximum contrast ratio was 47:1. As explained above, the maximum value of the contrast ratio including non electrode portion was increased by using the base plate attached with the black matrix and black beads than that of the embodiment 3.

Next, an application example of the liquid crystal display apparatus relating to the present invention is explained hereinafter.

Figure 36:
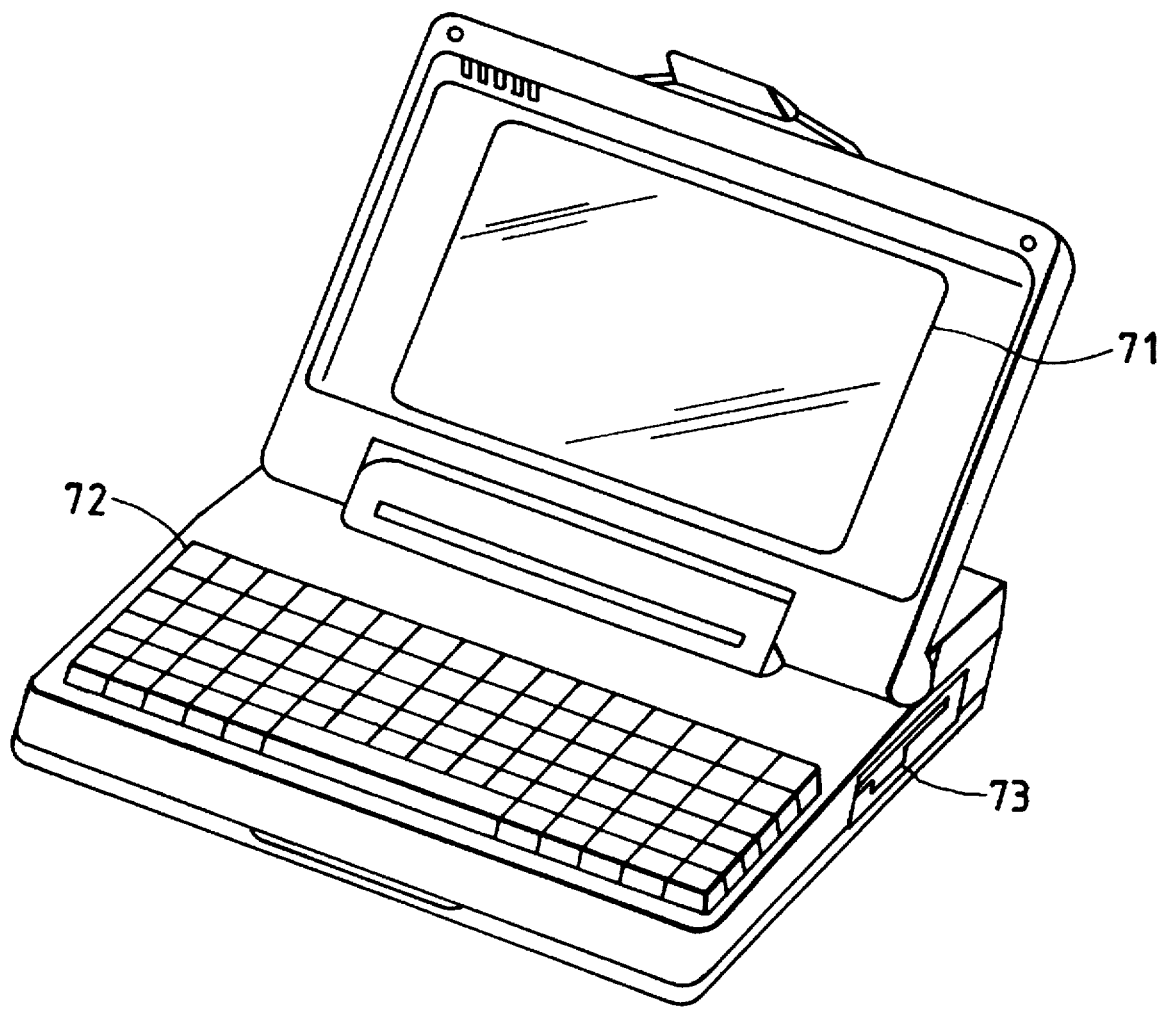
FIG. 36 is a perspective view indicating an appearance of a lap-top type personal computer schematically when the liquid crystal display apparatus of the present invention is applied to the personal computer.

An example wherein the liquid crystal display apparatus of the present invention is applied to a lap top type personal computer is illustrated in FIG. 36. In FIG. 36, the numeral 71 indicates a display portion, 72 is a key board, and 73 is a disk drive portion. The liquid crystal display apparatus explained in the above embodiments can be applied to the display portion 71.

Although the above embodiments are explained with twisted nematic layers, the present invention can be applied to other liquid crystal display apparatus such as, for example, non twisted parallel (homogeneous) oriented cells, and vertically (homeotropic) oriented cells. Furthermore, the present invention can be applied to any liquid crystal layers in addition to smectic or nematic liquid crystals without particular restriction as far as the liquid crystal has an optical anisotropy. The present invention also can be applied to not only a time sharing driving type liquid crystal display apparatus using XY electrodes, but also to multiplex driving type such as TFT type liquid crystal display apparatus. Moreover, the present invention can be applied to any of transparent type, semi-transparent type, reflection type, and projection type monochromatic or colored liquid crystal display apparatus.

Embodiment 13

In the liquid crystal display apparatus used in the embodiment 3, color filter layer and coating layer were disposed between the base plate of bottom side and the electrode of bottom side. The color filter layer was composed by three kinds of geratines which were colored red, green, and blue, respectively. Each colored geratine was shaped into stripes which correspond to picture elements. The coating layer was disposed between the color filter layer and the electrode of bottom side so that level the surface which electrode was disposed. B-V characteristics was measured in each picture elements corresponding color filter layer colored red, green, and blue, respectively. The obtained maximum contrast ratio of each picture elements corresponding color filter layer colored red, green, and blue are 35:1, 46:1, and 30:1.

As mentioned above, improved contrast ratio superior significantly to that of conventional phase plate type STN-LCD could be realized in the phase plate type STN-LCD equipped with color filter layer.

Next, comparative examples to the liquid crystal display apparatus of the present invention are explained hereinafter.

Comparative Example 1

Figure 27:
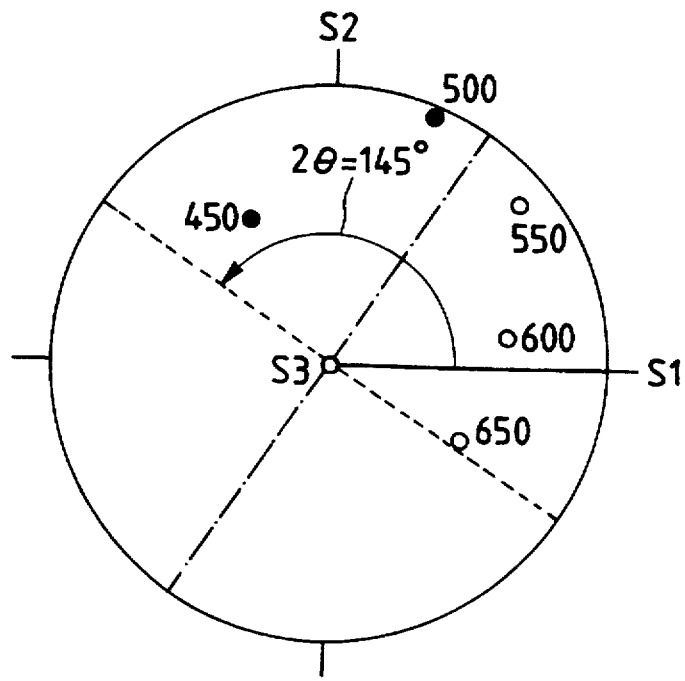
FIG. 27 is a Poincare sphere sighted from a S3 axis direction for indicating a wavelength dependency of polarizing light transmitted through a liquid crystal layer and a slow axis angle of a birefringent media when 2.38 volt is applied to the liquid crystal display apparatus in the comparative example 1.

The liquid crystal display apparatus in the embodiment 1 was supplied with a $V_{OFF}$ giving the peak value of Δ parameters, 2.20 V, and normalized Stokes parameters of transmitted light were determined at each of wavelength, 450 nm, 500 nm, 550 nm, 600 nm, and 650 nm. The result of the determination is shown in FIG. 27. Each of dots in FIG. 27 are distributed in a circular arc shape. An angle formed by a regression line and a S1 axis is 55°, and a slow axis angle of birefringent media is determined as 73° from a calculation, (55°+90°)× 0.5.

Next, a wavelength dependency of the retardation for the phase plate necessary for + primary phase difference compensation was obtained by taking θ in the equation (1) equals to 73°. The result was as shown by black dots in FIG. 28. The wavelength dependency of birefringence defined by the equation (2) was 0.62.

Figure 28:
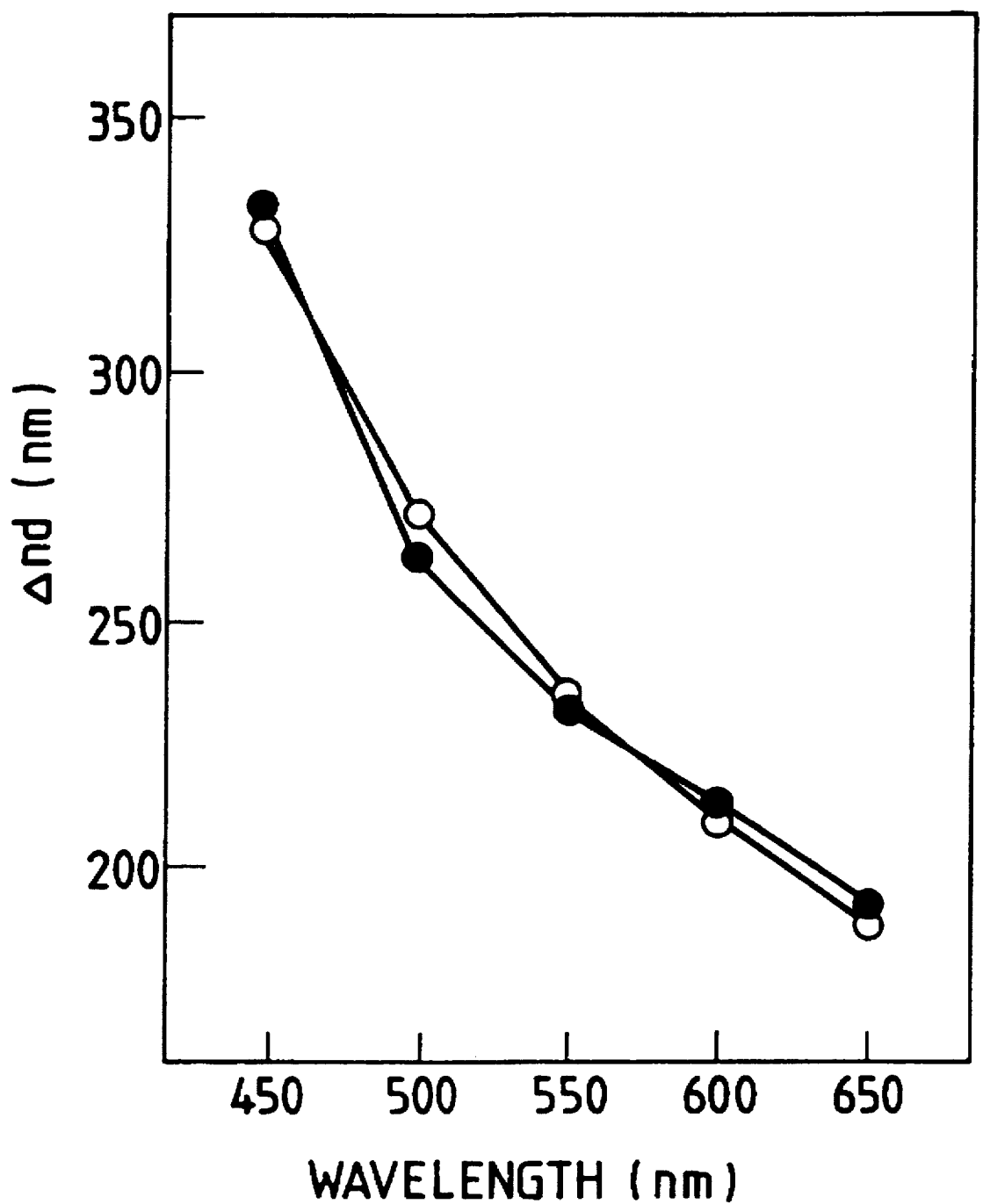
FIG. 28 is a graph indicating a wavelength dependency of birefringent media necessary for performing + primary compensation to the liquid crystal display apparatus in the comparative example 1 (black dot), and a wavelength dependency of birefringence of birefringent media used in the liquid crystal display apparatus in the comparative example 1 (white dot)

In order to prepare birefringent media having a wavelength dependency of the retardation as shown in FIG. 28, polycarbonate and polyvinyl alcohol were so laminated that their respective slow axis crossed over perpendicularly each other. The retardation at wavelength 550 nm is 1410 nm for polycarbonate, and 1180 nm for polyvinyl alcohol. The wavelength dependency of birefringence of the birefringent media prepared in the manner described above was 0.61. The wavelength dependency of the retardation is shown by white dots in FIG. 28. The black dots and the white dots almost coincided.

Figure 29A:
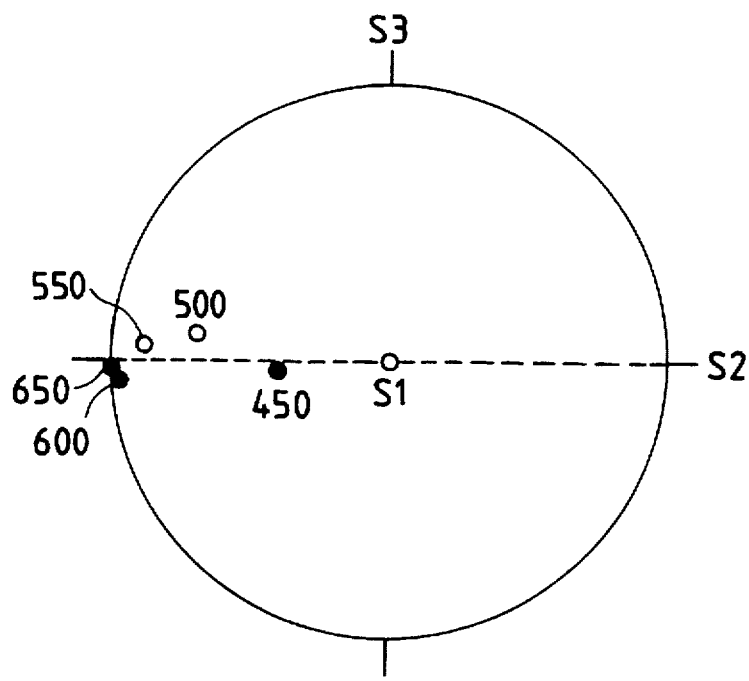
FIG. 29(a) is a Poincare sphere sighted from a S1 axis direction.
Figure 29B:
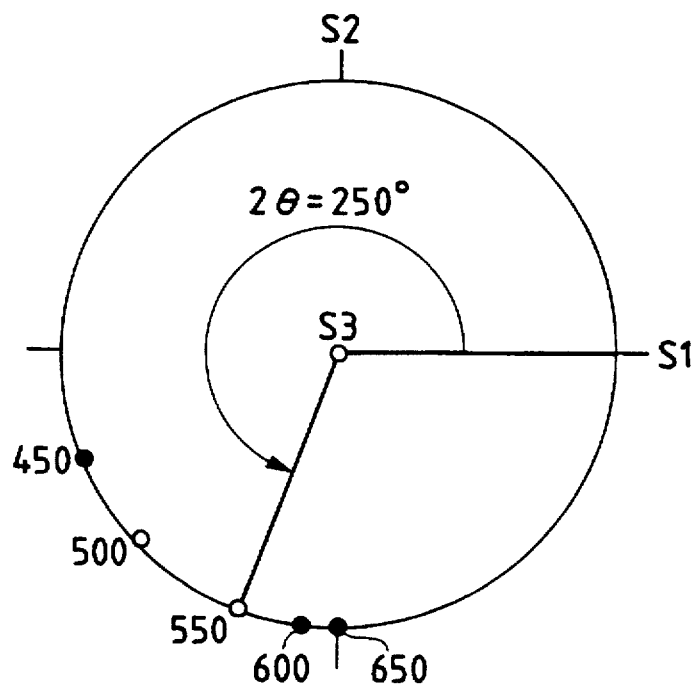
FIG. 29(b) is a Poincare sphere sighted from a S3 axis direction.

The birefringent media prepared in the manner described above were adhered to the STN-LCD with setting the obtained slow axis angle at 73°. Subsequently, the STN-LCD was applied with a voltage 2.22 V, and polarizing conditions of the transmitting light were determined. The results were shown in FIG. 29(a) and FIG. 29(b). FIG. 29(a) illustrates a Poincare sphere sighted from a S1 axis direction. The result reveals that, although the obtained values at respective wavelength are located near the equator, a width of the values' spread is wider than that in the embodiment 1 because distribution at a time when the twisted nematic liquid crystal layer is projected is deviated from a straight line. FIG. 29(b) is a Poincare sphere sighted from a S3 axis direction, and it reveals that the values obtained at respective wavelength are located in a range from 200° to 270° anticlock wise from the S1 axis. Accordingly, the top polarizer was adhered in a manner that its absorbing axis becomes 250° in order to decrease transmitting light in a dark state.

B-V characteristics of the phase plate type STN-LCD prepared in a manner described above was determined. Area of the determination was restricted to a portion of a picture element. A normally close type B-V curve was obtained. The maximum contrast ratio, 6.2:1, was obtained at the applied voltage of 2.20 V.

As explained above, if the applied voltage is not selected properly for making the transmitted light be distributed almost linearly on a Poincare sphere sighted from a S3 axis direction, decrease of the transmitted light in a dark state is insufficient and an improved contrast ratio can not be obtained.

Comparative Example 2

Figure 30A:
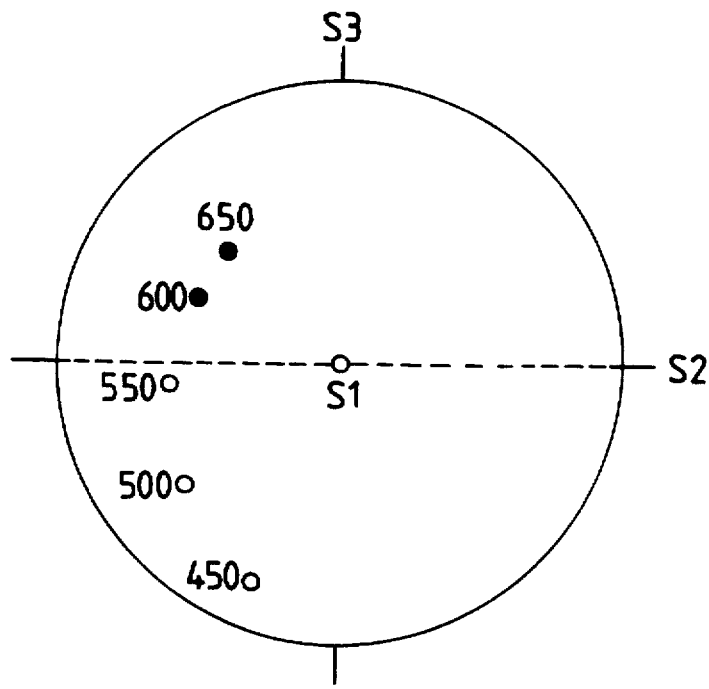
FIG. 30(a) is a Poincare sphere sighted from a S1 axis direction.
Figure 30B:
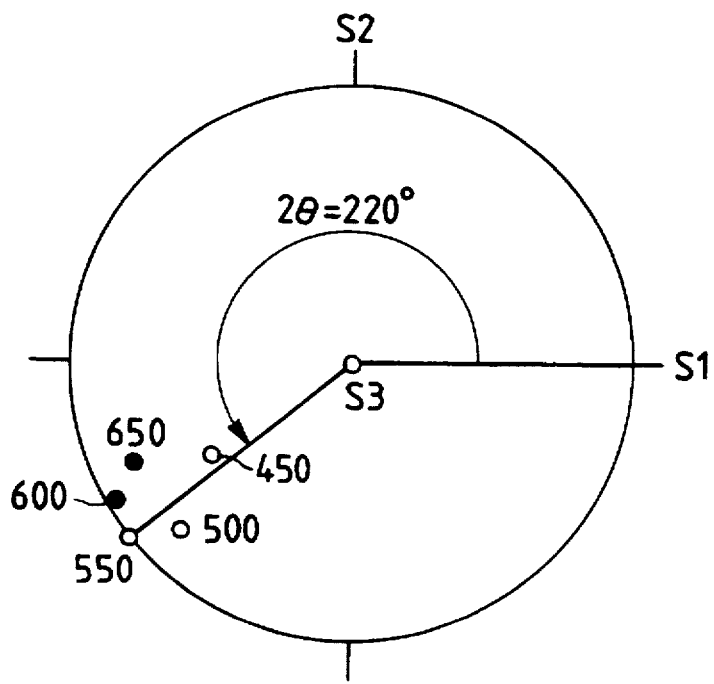
FIG. 30(b) is a Poincare sphere sighted from a S3 axis direction.

The liquid crystal display apparatus in the embodiment 1 was used with changing only the birefringent media to the one made from polycarbonate. The slow axis angle was made as same as the one in the liquid crystal display apparatus in the embodiment 1. As for the retardation value at wavelength 550 nm, a same value as the synthetic value from the retardation values for polycarbonate and polyvinyl alcohol in the embodiment 1 (that is, the retardation value for the birefringent media in the embodiment 1) was used. The wavelength dependency of the retardation of the birefringent media made from polycarbonate differs significantly from the required wavelength dependency of the retardation as shown by white triangles in FIG. 12. A voltage, 2.35 V, was applied to the liquid crystal display apparatus, and polarizing condition of the transmitted light was determined. The results are shown in FIGS. 30(a) and 30(b). FIG. 30(a) is a Poincare sphere sighted from a S1 axis direction, and dots expressing polarizing condition at respective wavelength are distributed in a shape crossing the equator. Although the transmitted light at wavelength 550 nm locates near the equator, the transmitted light of shorter wavelength and of longer wavelength than wavelength 550 nm locate far from the equator. FIG. 30(b) is a Poincare sphere sighted from a S3 axis direction, and dots of respective wavelength are distributed around a point at 220° anti clock wise from the S1 axis.

The top polarizer was adhered in a manner that its absorbing axis becomes 110° in order to decrease transmitting light in a dark state.

B-V characteristics of the phase plate type STN-LCD prepared in a manner described above was determined. Area of the determination was restricted to a portion of a picture element. The maximum contrast ratio, 5.5:1, was obtained at the applied voltage ($V_{OFF}$) of 2.22 V.

As explained above, if the wavelength dependency of birefringence of the birefringent media does not coincide with that of the polarizing condition of the transmitted light through the liquid crystal layer, decrease of the transmitted light in a dark state is insufficient and an improved contrast ratio can not be obtained.

As explained above, the present invention provides a liquid crystal display apparatus having high contrast ratio and preferable viewing performance.

What is claimed is;

1. A liquid crystal display apparatus comprising:
   a pair of facing base plates provided with electrodes,
   a liquid crystal layer,
   a pair of polarizers,
   at least one optical compensation layer, and
   a driving means capable of applying at least two voltages;
   said apparatus having a structure wherein:
      said facing base plates hold said liquid crystal layer therebetween,
      said polarizers are arranged outside said facing base plates, and
      said optical compensation layer is arranged between said polarizer and said facing base plate;
   said apparatus is characterized in that:
      said driving means applies an applied voltage to said liquid crystal layer in a dark state so that said applied voltage makes light of all wavelengths take a same sign in a S3' direction when light having plural wavelengths transmitted through said liquid crystal layer are expressed by normalized Stokes parameters, respectively, where S1', S2', and S3' are also coordinate axes of a Poincare sphere,
      said optical compensation layer has wavelength-dependence characteristics of retardation which substantially coincides with wavelength-dependence characteristics of retardation of said liquid crystal layer when said liquid crystal layer is in a condition wherein the respective normalized Stokes parameter S3' of light having plural wavelengths transmitted through said liquid crystal layer takes a same sign for light of all wavelengths, and said optical compensation layer is arranged so that its slow axis crosses over a regression line which is obtained in connection with S1' and S2' among the normalized Stokes parameters for light having plural wavelengths transmitted through said liquid crystal layer, and
      an absorbing axis of a polarizer among said pair of polarizers located at a side of said optical compensation layer is set in an angle so as to cross over either of two points at which said regression line crosses over the equation on the Poincare sphere sighted from the S3' axis direction.

2. A liquid crystal display apparatus as claimed in claim 1, wherein
   said driving means obtains said regression line in connection with S1' and S2' among the normalized Stokes parameters S1', S2', S3' for light having plural wavelengths transmitted through said liquid crystal layer, and displays the dark state with an applied voltage which makes a square sum of deviation of said regression line from S1', and S2' of transmitted light having respective wavelength equal to or less than a predetermined value.

3. A liquid crystal display apparatus as claimed in claim 2, wherein
   an angle formed between said slow axis of the optical compensation layer and the said S1' axis on the Poincare sphere sighted from S3' axis direction is designated as 2θ, and a phase difference δ(λ) at a respective wavelength of said optical compensation layer having a plurality of wavelengths is determined by the following equation (1), where n is an arbitrary integer;

$$\delta(\lambda)=180 \text{ n} \pm \arctan((S1'\cos2\theta-2S2'\sin2\theta)/S3') \quad (1).$$

4. A liquid crystal display apparatus as claimed in claim 3, wherein
   said plural wavelengths transmitted through said liquid crystal layer are selected from a range of visible light including a wavelength of 550 nm.

5. A liquid crystal display apparatus as claimed in claim 4, wherein
   said optical compensation layer is a laminated body composed of at least two birefringent media phase plate A, phase plate B, having different wavelength dependencies of birefringence respectively, and the phase plate A and the phase plate B are arranged so that their slow axes cross over each other.

6. A liquid crystal display apparatus as claimed in claim 5, wherein
   said optical compensation layer has a wavelength dependency of birefringence defined by the following equation (2), where $\Delta n_R$ is a birefringence at wavelength of 650 nm, $\Delta n_G$ is a birefringence at wavelength of 550 nm, $\Delta n_B$ is a birefringence at wavelength of 450 nm;

$$\text{Wavelength dependency of birefringence}=(\Delta n_B \Delta n_R)/\Delta n_G; \quad (2).$$

7. A liquid crystal display apparatus as claimed in claim 6, wherein
   said optical compensation layer has a wavelength dependency of birefringence in a range of 0.5–3.0, and retardation at wavelength of 550 nm in a range of 50 nm–200 nm.

8. A liquid crystal display apparatus as claimed in claim 6, wherein
   said liquid crystal layer is a twisted nematic liquid crystal layer having a twisted angle in a range 180°–270°, a product $\Delta n_{LC} d_{LC}$ of thickness $d_{LC}$ and birefringence $\Delta n_{LC}$ of the twisted nematic liquid crystal layer in a range 0.75 μm–1.0 μm, and multiplex driving type XY matrix electrode as electrodes for the liquid crystal, and
   display dark state with the highest voltage among voltages of at least two values supplied from the driving means, and
   a phase difference at wavelength 550 nm is determined so as to have a n equals to zero (n=0) and a positive sign for the second term in the equation (1).

9. A liquid crystal display apparatus as claimed in any of claims 1 to 8, wherein
   said liquid crystal layer is further provided with a black matrix for covering a portion that is not covered with the electrode of said liquid crystal layer.

10. A liquid crystal display apparatus as claimed in any of claims 1 to 8, wherein
    said liquid crystal layer is provided outside with a black matrix for covering a portion that is not covered with the electrodes of said liquid crystal layer, and further provided inside with opaque beads.

11. A liquid crystal display apparatus as claimed in claim 6, wherein
    a wavelength dependency of birefringence defined by the equation (2) of said phase plate A is in a range 0.0001–0.1, and a wavelength dependency of birefringence of said phase plate B is in a range 0.1– 0.3.

12. A liquid crystal display apparatus as claimed in claim 6, wherein
    the retardation of said phase plate A is smaller than the retardation of said phase plate B.

13. A liquid crystal display apparatus as claimed in claim 6, wherein an angle formed by a transmitting axis of said polarizer at a light source side with an optical axis of said phase plate B is at most 30°.

14. A liquid crystal display apparatus as claimed in claim 6, wherein said liquid crystal layer is a twisted nematic liquid crystal layer having a twisted angle in a range 180°–270°, a product $\Delta n_{LC} d_{LC}$ of thickness $d_{LC}$ and birefringence $\Delta n_{LC}$ of the twisted nematic liquid crystal layer in a range 0.75 nm–1.0 nm, and multiplex driving type XY matrix electrodes as electrodes for applying voltage to said liquid crystal, and performing a display in a dark state with the highest voltage among voltages of at least two values supplied from the driving means, and a phase difference at wavelength 550 nm is determined by any one of the following methods from (a) to (e):
 (a) In the equation (1), it is taken as n=1, and a positive sign (+) for the second term,
 (b) In the equation (1), it is taken as n=2, and a positive sign (+) for the second term,
 (c) In the equation (1), it is taken as n=1, and a negative sign (−) for the second term,
 (d) In the equation (1), it is taken as n=2, and a negative sign (−) for the second term,
 (e) In the equation (1), it is taken as n=3, and a negative sign (−) for the second term.

15. A liquid crystal display apparatus as claimed in claim 14, wherein said optical compensation layer has a wavelength dependency of birefringence in a range −1.0–0.0, and retardation at wavelength 550 nm at least 300 nm.

16. A liquid crystal display apparatus as claimed in claim 14, wherein a wavelength dependency of birefringence defined by the equation (2) of said phase plate A is in a range 0.0001–0.1, and a wavelength dependency of birefringence of said phase plate B is in a range 0.1– 0.3.

17. A liquid crystal display apparatus as claimed in claim 14, wherein the retardation of said phase plate A is larger than the retardation of said phase plate B.

18. A liquid crystal display apparatus as claimed in claim 14, wherein an angle formed by a transmitting axis of said polarizer at a light source side with an optical axis of said phase plate B is at most 30°.

19. A liquid crystal display apparatus as claimed in any of claims 14 to 18, wherein said liquid crystal layer is further provided outside with a black matrix for covering a portion that is not covered with the electrode of said liquid crystal layer.

20. A liquid crystal display apparatus as claimed in any of claims 14 to 18, wherein said liquid crystal layer is provided outside with a black matrix for covering a portion that is not covered with the electrodes of said liquid crystal layer, and further provided inside with opaque beads.

* * * * *